United States Patent
Morioka et al.

(10) Patent No.: US 6,913,028 B2
(45) Date of Patent: Jul. 5, 2005

(54) FLEXIBLE CONTAINER FOR LIQUID TRANSPORT, LIQUID TRANSPORT METHOD USING THE CONTAINER, LIQUID TRANSPORT APPARATUS USING THE CONTAINER, METHOD FOR WASHING THE CONTAINER, AND WASHING EQUIPMENT

(75) Inventors: Koitsu Morioka, Toyama-ken (JP); Yoshimitsu Asano, Oofunato (JP); Hiromasa Asano, Oofunato (JP); Tokuo Oozeki, Iwate-ken (JP); Nobuhiro Ichikawa, Namerikawa (JP); Jyunichiro Kudo, Machida (JP)

(73) Assignees: YKK Corporation, Tokyo (JP); Asano Transportation Co., Ltd., Iwate-Ken (JP)

( * ) Notice: Subject to any disclaimer, the term of this patent is extended or adjusted under 35 U.S.C. 154(b) by 328 days.

(21) Appl. No.: 10/231,002

(22) Filed: Aug. 30, 2002

(65) Prior Publication Data

US 2002/0195131 A1 Dec. 26, 2002

Related U.S. Application Data

(62) Division of application No. 09/652,156, filed on Aug. 31, 2000.

(30) Foreign Application Priority Data

Sep. 1, 1999 (JP) .......................................... 11-247709
Oct. 1, 1999 (JP) .......................................... 11-282033

(51) Int. Cl.[7] ............................................... B08B 3/02
(52) U.S. Cl. ........................... 134/61; 134/76; 134/95.3; 134/148; 134/152; 134/166 R; 134/169 R
(58) Field of Search ............................ 134/61, 62, 76, 134/95.2, 95.3, 103.2, 140, 148, 152, 166 R, 169 R

(56) References Cited

U.S. PATENT DOCUMENTS 2,442,044 A * 5/1948 Howard ........................ 383/59
2,957,283 A * 10/1960 Mitchell ....................... 53/426

(Continued)

FOREIGN PATENT DOCUMENTS

| DE | 35 45 855 | * | 7/1987 |
| JP | 6-292873 | * | 10/1994 |
| JP | 7-195049 | * | 8/1995 |

Primary Examiner—Frankie L. Stinson
(74) Attorney, Agent, or Firm—Finnegan, Henderson, Farabow, Garrett & Dunner, L.L.P.

(57) ABSTRACT

A flexible container for liquid transport made of a flexible material includes a top face portion, a bottom face portion, and a peripheral face portion connecting the top face portion and the bottom face portion. An air tight, water resistant slide fastener is openably/closably mounted to the peripheral face portion of the container. A liquid stirring port is provided at the top face portion, and a liquid injecting and ejecting port are provided at a lower end of a rear face portion of the peripheral face portion. Container suspending pieces and bottom face portion fixing pieces are mounted at the top face portion of the container and at four corners of the bottom face portion. During washing, the container can be washed reliably and efficiently while the inside of the spread out container can be visually checked by efficiently utilizing the air tight, water resistant slide fastener, liquid stirring port, liquid injecting and ejecting port, and container suspending pieces, and bottom face port fixing pieces. Thus, according to the present invention, washing, sterilizing and disinfecting treatments and thereafter drying treatment by heating can be performed efficiently, with the container having higher strength, higher air tightness and water resistance.

12 Claims, 29 Drawing Sheets

U.S. PATENT DOCUMENTS

| | | | | |
|---|---|---|---|---|
| 3,065,621 A | * | 11/1962 | Mehdi | 68/148 |
| 3,097,677 A | * | 7/1963 | Mitchell | 383/72 |
| 3,734,108 A | * | 5/1973 | Almegard et al. | 134/76 |
| 3,893,843 A | * | 7/1975 | Fry et al. | 134/10 |
| 4,354,514 A | * | 10/1982 | Sundheimer et al. | 134/152 |
| 4,573,508 A | * | 3/1986 | Knaus | 220/562 |
| 4,643,475 A | * | 2/1987 | Neumann | 296/10 |
| 5,478,406 A | * | 12/1995 | Derby et al. | 134/16 |

* cited by examiner

FLEXIBLE CONTAINER FOR LIQUID TRANSPORT, LIQUID TRANSPORT METHOD USING THE CONTAINER, LIQUID TRANSPORT APPARATUS USING THE CONTAINER, METHOD FOR WASHING THE CONTAINER, AND WASHING EQUIPMENT

This is a divisional of application Ser. No. 09/652,156, filed Aug. 31, 2000.

BACKGROUND OF THE INVENTION

1. Field of the Invention

The present invention relates to a flexible container having a specific structure consisting of a rubber coated fabric or the like and adopted to contain and transport liquid; a liquid transport method and apparatus using the container, and a method and facility for washing the container.

2. Description of the Related Art

Conventionally, in a case where specific liquid is transported by means of a vehicle exclusive for liquid transport, equipped with a tank, there is no inconvenience if such specific liquid is housed and transported on a way to go and another liquid is housed and transported on a way to return. However, in a case where no liquid is transported on a way to return, the vehicle has to return with only empty containers, which is extremely inefficient from an economical aspect.

In order to solve such problem, Japanese Patent Laid-open Publication No. 3-275485 and Japanese Utility Model Laid-open Publication No. 5-13993, for example, disclose flexible containers for liquid transport, in which the liquid is contained in a foldable flexible container, transported to a destination, and replaced into another container at the destination. Thereafter, the flexible container is folded, which has made it possible to load another ordinary carriage on a returning vehicle and transport it on a way to return. All of these containers are provided with liquid injecting and ejecting ports.

In the meantime, in a case where the flexible container is loaded in a freight container and transported while liquid is contained therein, the liquid is less moved, and the flexible container is less deformed during constant-speed running when a vehicle runs at a constant speed without any acceleration or deceleration. However, at the braking, startup, or acceleration of the vehicle, the liquid moved in the forward and backward direction due to inertia, so that the flexible container for liquid transport is locally swelled at its upper portion. As a result, local distortion is repeatedly generated at the flexible container for liquid transport, whereby its durability is lowered. In particular, the liquid is significantly moved due to inertia caused by braking. When the vehicle brakes, particularly in sudden stoppage, the rate of swelling of the flexible container becomes greater than that made in the other acceleration or deceleration. Thus, a shocking load acts to an driver at every braking, so that the subsequent driving is impaired.

According to suggestions of the above publications, there is adopted a structure in which deformation due to the liquid movement of the container is reduced to the minimum in order to eliminate the lowered durability of the flexible container or discomfort of the driver as described above. in Japanese Patent Laid-open Publication No. 3-275485 for example, the Young's module of a material for a ¼ portion at the forward side of the container, especially the upper part of it, which is the most deformable during braking, is set to be greater than that of the other portion so as to reinforce the material. Alternatively, in the aforementioned Japanese Utility Model Laid-open Publication No. 5-13993, a band is secured to a peripheral face of a cylindrical flexible container at a height which is ½ or less from a bottom face thereof, or a core material reinforcing layer and a highly elastic element are laminated integrally with each other in order to enhance rigidity.

In this manner, because the lowered durability of the flexible container or discomfort of the driver can be eliminated, advantageous effect of transport using a flexible container of such type as described above has been increased. In the recent years, in food industries such as drinks or food oil, attention is focused on transport using these flexible containers. In particular, if it becomes possible to transport fresh milk or various juices or the like contained in the containers from a source to a consuming area, the transport efficiency is improved as described above, which is economically profitable considering the price of the container. Hence, in edible liquid of such type, the freshness is most essential. Moreover, it is greatly restricted from the viewpoint of food sanitation.

Specifically, if liquid to be transported by a flexible container of such type is edible liquid, drinks or the like, the inside of the container must always be cleaned and sanitarily controlled. After having been transported, therefore, the aforementioned flexible container is subject to liquid treatments such as washing, sterilization, and disinfecting treatments. In order to facilitate these treatments, according to the specification of U.S. Pat. No. 3,965,953 for example, an air tight and water resistant slide fastener of 5 cm in length is mounted to a center of an upper surface in a longitudinal direction of an elongated flexible container having its liquid capacity of 1 m³, so that the fastener mounted portion can be opened and closed.

In the flexible container disclosed in the U.S. Pat. No. 3,965,953 specification, a slit-shaped opening is formed openably on the center of the upper surface of the container by means of an air tight water resistant slide fastener. With only such a small slit shaped opening, however, there has been a problem that an attempt to surely wash, sterilize, or disinfect the inside of the container has been extremely cumbersome. In particular, the subsequent drying treatment requires long time.

On the other hand, in a case where a flexible container containing a liquid is loaded and transported on the exclusive, the liquid is less moved in the flexible container and the container is less deformed during constant-speed running when the vehicle runs at a constant speed without acceleration or deceleration as indicated by solid line in FIG. 35. However, during braking, startup, or acceleration of the vehicle, the liquid is moved in the forward and backward direction of the vehicle due to inertia, and there occurs a phenomenon that the flexible container is locally swelled as indicated by two short dotted lines in the figure. In particular, such swelling occurs in a wave-shape at the upper portion of the flexible container.

As in the flexible container disclosed in the U.S. Pat. No. 3,965,963 specification, in the case where an airtight water resistant slide fastener is mounted to the upper surface portion of the flexible container, a large stress is repeatedly applied to the air tight water resistant slide fastener due to the repeated swelling of the flexible container. As a result, the air tightness and water resistance of the slide fastener are lowered, and liquid leakage occurs.

Further, in the flexible container disclosed in the USP specification as well as the flexible container disclosed in the above publication, it is impossible to spread the container itself. Even if washing is performed for every transport, visual check cannot be performed, which makes it impossible to ensure that the inside of the container is surely cleaned.

SUMMARY OF THE INVENTION

The present invention has been made in order to solve the aforementioned various problems. It is, therefore, an object of the present invention to provide a flexible container for liquid transport capable of performing efficient washing, sterilization & disinfecting treatment as well as drying treatment, and at the same time, ensuring required durability and air tightness & water resistance. It is also an object of the present invention to provide a liquid transport method and apparatus using the container, and a method and facility for washing the container.

In order to achieve the above objects, the inventors made utmost efforts and experiments as to what kind of container structure should be provided to ensure the most efficient washing or sterilization treatment or the like, and to ensure required strength, and moreover, prevent a container from liquid leakage. As a result, there was made a conclusion that a structure capable of exposing a majority of an inside surface of the container to outside during washing makes it possible to perform the above treatments and drying using the liquid quickly and efficiently.

The inventors considered that the above washing, sterilization, and drying treatments can be performed efficiently if the container is structured such that a peripheral face portion connecting a top face portion and a bottom face portion thereof is vertically divided into two sections, a part of which is fixed, while at least ½ of a periphery of the peripheral face portion is openable/closable with air tightness.

According to a first aspect of the present invention, there is adopted the simplest and most rational structure based on the above result of the consideration. That is, the present invention is directed to a flexible container for liquid transport comprising a top face portion, a bottom face portion, and a peripheral face portion connecting the top face portion and the bottom face portion, wherein an air tight, water resistant slide fastener is openably/closably mounted to the peripheral face portion, and a mount height h of the slide fastener from the bottom face portion is ½ or less of a total height H of the container.

The above flexible container for liquid transport can transport not only drinks such as milk or juice but also food oil or the like. Therefore, according to a second aspect of the present invention, the constituent elements of the container are flame resistant so that safety against fire can be ensured. In order to obtain flame resistance, not only a container constituent sheet and the air tight, water resistant slide fastener is made of flame resistant material, but also metal plating or the like is applied to surfaces of these. Alternatively, a proper flame resistant material may be added to these materials.

In these aspects of the present invention, the shape of the container is not particularly limited, and there may be employed an elongated three-dimensional container, a cylindrical container, or a container having a polygonal shape such as triangular or pentagonal shape as far as the container has a top face portion, a bottom face portion, and a peripheral face portion connecting the top face portion and bottom face portion.

As a result of a plenty of experiments, with respect to a behavior of the liquid in a flexible container due to acceleration or deceleration during startup or braking during transport, it is found that the liquid moves significantly forward and backward in a height which is substantially ½ from a liquid level, as shown in FIG. 35, and the movement amount is extremely small at a portion deeper than the above level. Specifically, the liquid in a container moves the most greatly at a portion close to the front face portion of the top face portion, and its movement amount is gradually reduced in a deeper portion. At a deeper portion below ½ of the container, the liquid hardly moves. Thus, when the movement amount changes, stress acting to the front face portion or the rear face portion of the container changes similarly. The swelling amount of the flexible container depends on its change amount.

On the other hand, for an air tight, water resistant slide fastener applied to a flexible container of this type, there can be adopted a structure which is similar to that of a conventional air tight, water resistant slide fastener to be used for water resistant cloth or diving suit. As described above, an extremely large liquid pressure is applied during liquid transport. Therefore, a variety of limitations are applied to its material or processing precision.

With respect to a structure of the air tight, water resistant slide fastener used for diving suit or the like, each of a pair of fastener stringers composed of water resistant tapes is bent in a substantial Ω shape at its one side edge. At the bent portions, a number of substantially T shaped teeth are respectively pinched by C shaped tooth clamps, and are fixed in parallel. A slider is so constructed that the mutually opposite teeth are made to be engaged with each other, and at the same time, opposite pairs of top and bottom bent portions of the tape bent portions are tightly pressed to each other, thereby imparting air tightness and water resistance to the slide fastener.

A water resistant tape composing a fastener stringer to be used in the present invention is a tape in which synthetic rubber, polyvinyl chloride resin, or polyurethane resin is coated or pasted to a base cloth woven by warp yarns and weft yarns, thereby imparting water resistance and elasticity. On the other hand, various kinds of metals are used for the teeth and slider.

In addition, when liquid of 11 $m^3$ is contained and sealed in an elongated three-dimensional container of 4290 mm in length, 2290 mm in width, and 1140 mm in height, the stress at a position of 200 mm below from the top face portion of the container during sudden stoppage of the vehicle is substantially 2.5 to 3 times of the stress in the container acting to a position of 200 to 300 mm above from the bottom face portion of the container.

In view of these factors, as well as safety, according to the first aspect of the present invention, it is required to mount an air tight, water resistant slide fastener at a position of ½ or less of a total height of the container. Desirably as in a third aspect of the present invention, the mount height h of the air tight, water resistant slide fastener from the container bottom face portion is within a range of 1/10 to ½ of the total height h of the container. In a case where the air tight, water resistant slide fastener is mounted to a corner which is a boundary between the bottom face portion and peripheral face portion of the container, there is a danger that the air tight, water resistant fastener is perpendicularly bent at a longitudinal direction of engaging portions of the slide fastener so that excessive force is applied to the engaging portions, and liquid leakage occurs.

Therefore, it is preferable that the air tight, water resistant slide fastener be mounted at flat portions excluding corners of the container. Further desirably, as in a fourth aspect of the present invention, the mount height h of the air tight, water resistant slide fastener from the bottom face portion is within a range of ⅐ to ⅓ of the total height h of the container. Because it is required to provide a liquid injecting and ejecting port at the peripheral face portion in the vicinity of the bottom face portion of the container, it is preferable that the air tight, water resistant slide fastener be mounted to such upper position avoiding the mount position of the liquid injecting and ejecting port.

According to a fifth aspect of the present invention, the container is defined as an elongated three-dimensional container in which the peripheral face portion comprises a front face portion, a rear face portion, and first and second side face portions. Moreover, the container is so defined that the air tight, water resistant slide fastener is continuously mounted over three face portions among the front face portion, rear face portion, and the first and second side face portions, and upper and lower stoppers of the air tight, water resistant fastener are arranged at the other face portion excluding the front face portion.

In this way, the air tight, water resistant slide fastener is continuously mounted over at least three face portions of the front face portion, rear face portion, and first and second side face portions among four peripheral face portions of the elongated container. Therefore, when the slide fastener is opened, the container is opened into two sections at the three face portions at which the slide fastener is continuously mounted, so that the inside surface of the container is exposed substantially fully. As a result, the container washing or sterilization treatment and drying treatment can be performed continuously and efficiently. The container can always be used as a clean container. In particular, sanitary management is facilitated in transport of drinks such as milk or juice.

The front face portion should be always included in the above-mentioned three face portions at which the air tight, water resistant fastener is continuously mounted. This is because the liquid in the flexible container moves significantly in the forward direction during sudden braking of a transport vehicle in which the operation is repeatedly done so that the largest load is applied to the front face side, as described above. Thus, in a case where the upper and lower stoppers of the air tight, water resistant slide fastener are mounted to the front face portion, there is a danger that the container will lose the air tightness and water resistance at an earlier stage.

According to a sixth aspect of the present invention, the container is so defined that the air tight, water resistant slide fastener is continuously mounted over the front face portion, rear face portion, and second side face portion, and the upper and lower stoppers are arranged at the first side face portion.

In this aspect of the invention, the feature of the invention according to the fifth aspect is further limited, and the upper and lower stoppers of the air tight, water resistant slide fastener are mounted to the first side face portion. Specifically, in a case where the liquid is transported by using the flexible container of such type, an excessive load acts to the front or rear face portion of the container when the liquid in the container moves under braking or acceleration and deceleration of the transport vehicle. However, not so large load change occurs at the side face portions. Therefore, the upper and lower stoppers, which are the most likely to be damaged in the air tight, water resistant slide fastener, are mounted to the first side face portion.

Further, an opening and closing end of the air tight, water resistant slide fastener against the container is extended to the first side face portion, which makes it possible to further largely and efficiently open and spread out the container. In particular, the liquid residue quantity can be reduced to the minimum by the washing or sterilization treatment as well, and the drying efficiency is further improved.

According to a seventh aspect of the present invention, there is provided a container comprising engaging means for engagingly fitting a slider to the upper stopper and/or a part of peripheral face portion of the air tight, water resistant slide fastener during closing of the air tight, water resistant slide fastener. In general, an air tight, water resistant slide fastener has such a structure that its slider is adapted to be engagingly fitted to its upper stopper when the slider fastener is closed. However, as in the present invention, in the case where the aforementioned excessive and shocking load is repeatedly applied to the slide fastener, there is a danger that said engaging fitting is broken, so that the slider works spontaneously, and the upper end of the slide fastener is opened, whereby the liquid in the container leaks out.

In the present invention, in order to prevent the engaging fitting from breaking, there is adopted a structure in which a part of the slider, for example, a pull tab mounted to a part of the slider can be engagingly fitted at a periphery of the upper stopper of the air tight, water resistant slide fastener by engaging fittings such as a snap button.

According to an eighth aspect of the present invention, there is provided a stirring port protruding upwardly at the top face portion of the flexible container, and an openable/closable liquid injecting and ejecting port formed on the peripheral face portion in the vicinity of the bottom face portion. Further, as in a tenth aspect of the present invention, which will be described later, it is desirable that air evacuating means for adjusting the air exhaust amount of the inside gas in accordance to the pressure in the container is provided at the stirring port. As this air evacuating means, it is preferable that an air tight, water resistant slide fastener be openably provided.

In this case, the air tight, water resistant slide fastener provided at the stirring port is spaced upwardly from the top face portion of the container. Thus, the fastener is not influenced by excessive pressure change caused by the liquid movement during liquid transport, and the size of the stirring port can be arbitrarily determined. Further, by adjusting the opening and closing quantity of the air tight, water resistant slide fastener, the air evacuation amount in the container can be regulated.

According to a ninth aspect of the present invention, container suspending pieces are provided at least at two positions of a peripheral edge of the top face portion, and bottom face portion fixing pieces are provided at least two positions of a peripheral edges of the bottom face portion.

With such structure, as in an eighteenth aspect of the present invention which will be described later, there can be adopted a method for washing a flexible container for liquid transport comprising: closing the air tight, water resistant slide fastener while a container is empty; forming the container to be in its swelled state; opening the liquid stirring port to jet the washing liquid toward an internal wall of the flexible container via the stirring port; and ejecting residue adhering to the internal wall and residue liquid in the container to the outside of the container via the liquid injecting and ejecting port.

Here, forming the container means that the flexible container is formed in a wrinkle free state and swelled which is the same as that when liquid is charged in the container, for a purpose of washing the inside of the flexible container in its contracted state after ejection of the transport liquid. As means for such forming, as in a twenty-second aspect of the present invention, it is preferable that this forming is done by blowing air to the inside of the flexible container. Further preferably, as in a twenty-third aspect of the present invention as described later, the air may be blown from the liquid injecting and ejecting port that is usually a liquid injecting and ejecting port for transport liquid as described in the eighth aspect of the present invention.

Further, as another means for such forming, as in a twenty-fourth aspect of the present invention which will be described later, such forming can be done by upwardly pulling a plurality of portions of the container to tense the container. Moreover, this tensing can be performed by utilizing the container suspending pieces and bottom face portion fixing pieces mounted to the container, as defined in the ninth aspect of the present invention, for fixing the container during liquid transport. Specifically, the container suspending pieces are supported and suspended by a support bar being overhung above the container in a vehicle or washing equipment for example, and the bottom face portion fixing pieces are fixed to be provided on the floor face of the vehicle or washing equipment in a tensile state, whereby a wrinkle free three-dimensional shape can be formed in a manner similar to that when the flexible container is charged with liquid.

In this state, as described above, air can be further blown into the container. At this time, the air tight, water resistant slide fastener that is the above-mentioned air evacuating means of the liquid stirring port is utilized to adjust its air evacuating quantity in accordance with the degree of opening and closing of the air tight, water resistant slide fastener. In a twenty-first aspect of the present invention as described later, in a case where the flexible container is formed in its shape by blowing air from the liquid stirring port, there is a possibility that, if the air blowing quantity is excessive, the container is broken due to its swelling. In the present invention, the air tight, water resistant slide fastener mounted to the liquid stirring port is opened as required, whereby the air in the container is evacuated to the outside.

In washing the container formed in its shape as described previously, while the air tight, water resistant slide fastener at the peripheral face portion is closed, a hose or the like is inserted into the container via the transport liquid stirring port mounted to the top face portion, and the washing liquid is jetted toward the internal wall of the container under a predetermined pressure. At this time, the jetting may be performed by using a general nozzle. However, as in a twenty-fifth aspect of the present invention, which will be as described later, it is preferable that a jetting nozzle for radiantly jetting may be used so that the internal wall of the container can be washed uniformly, and the washing time can be reduced. Further preferably, this simultaneous washing and ejecting the washing liquid to the outside of the container make it possible to effectively remove the residue adhering to the internal wall face of the container, residual liquid, and the washing liquid.

Further, when this washing liquid is jetted, as in the twenty-first aspect of the present invention, the washing liquid is jetted toward the internal wall of the flexible container, and at the same time, air is blown from the liquid stirring port, whereby the washing liquid can be positively ejected to the outside of the container by way of the air pressure, and the container is free from being contracted and wrinkled when being washed.

According to a fifteenth aspect of the present invention, there is provided a liquid transport method using a flexible container for liquid transport, the container comprising: a top face portion, a bottom face portion, and a peripheral face portion connecting the top face portion and the bottom face portion, and having an air tight, water resistant slide fastener openably/closably mounted to the peripheral face portion, the method comprising: charging a liquid in the flexible container; transporting it to a destination; ejecting the liquid in the container from the transported container into another container; opening the air tight, water resistant slide fastener after liquid ejection to spread out and open the peripheral face portion in a direction in which the top face portion and the bottom face portion are separated from each other as being fanned out about a basic point at a part of the peripheral face portion of the container, so that an internal face of the container is exposed; subjecting the flexible container having the exposed internal face to washing or sterilizing treatment, and then, drying the container; and closing the air tight, water resistant slide fastener of the container after the drying.

The liquids to be transported by a flexible container of this type are often various kinds of drinks. Therefore, the container must always be clean and sanitary. In the liquid transport method according to the present invention, the air tight, water resistant slide fastener is openably/closably mounted to the peripheral face portion of the flexible container, thereby making it possible to largely open at least the peripheral face portion of the container. Thus, by largely opening the peripheral face portion by operating the air tight, water resistant slide fastener when the inside of the container is subjected to washing or sterilizing treatment after the liquid has been ejected from the container having been transported, the container can be spread out outwardly, and the internal face of the container can be exposed to the outside. In this state, when the flexible container is subjected to washing or sterilizing treatment, the inside of the container can be washed and sterilized thoroughly and efficiently. Further, the drying time can be reduced during drying because the internal face of the container is directly exposed to the outside.

Furthermore, by closing the air tight, water resistant slide fastener of the container after having been dried, the inside of the container is prevented from being exposed to the outside air. As a result, cleanliness and sterile state can be maintained for a long time, which is very sanitary.

In a sixteenth aspect of the present invention, there is provided a liquid transport apparatus using a flexible container for liquid transport, the flexible container comprising a top face portion, a bottom face portion, and a peripheral face portion connecting the top face portion and the bottom face portion, and having an air tight, water resistant slide fastener openably/closably mounted thereto, said liquid transport apparatus comprising: the air tight, water resistant slide fastener mounted to the peripheral face portion of the flexible container; a vehicle having a storage chamber for storing the flexible container in a carriage; and a pair of support wall portions being movable in forward and backward direction of the carriage and to be fixed to the carriage, the support wall portions each including a hooking portion for fixing a bottom face portion fixing piece provided at the bottom edge of the flexible container.

In the storage chamber for the flexible container, in particular, a pair of forward and backward support wall portions are arranged in the forward and backward direction of the carriage. As a result, the front and rear face portions of the flexible container containing and sealing liquid that are easily subjected to the most excessive repetitive pressure changes during the liquid transport are supported by the forward and backward support wall portions, whereby the flexible container is prevented from swelling in the forward and backward direction to ensure durability of the container. Further, a shocking load upon a driver, which is caused by sudden braking or sudden acceleration during liquid transport, is reduced. Furthermore, a pair of the forward and backward support wall portions have engagement portions that can be engaged with the bottom face portion fixing pieces provided at a bottom edge of the flexible container. The bottom face portion of the flexible container can be fixed to be stabilized and immobilized on the carriage by engaging the bottom face portion fixing pieces and the engagement portion with each other.

According to a seventeenth aspect of the present invention, there is provided a method for washing a flexible container for liquid transport, which is preferable to a flexible container having an essential feature as described above and is the most simplest, the flexible container being made of an air tight, water resistant sheet material, the container comprising a top face portion, a bottom face portion, and a peripheral face portion connecting the top face portion and the bottom face portion, and having an air tight, water resistant slide fastener mounted to the peripheral face portion with an exclusion of a non-opening and closing portion, the washing method comprising: opening the air tight, water resistant slide fastener; suspending the container to spread out and open a lower part of the peripheral face portion in a direction in which the top face portion and the bottom face portion are separated from each other as being fanned out about an upper basic point at the non-opening and closing portion of the peripheral portion so that an internal face of the container is exposed to the outside; and drying the flexible container, after washing or sterilizing treatment.

The peripheral face portion of the container is thus largely opened, so that when the inside of the container is subjected to washing or sterilizing treatment after the liquid has been ejected from the container after the liquid transport, the air tight, water resistant slide fastener is operated to largely open the peripheral face portion, whereby the container can be spread out outwardly, and the internal face of the container can be exposed to the outside. When the flexible container is subjected to washing or sterilizing treatment in this state, the inside of the container can be washed or sterilized fully and efficiently. Further, the drying time can be greatly reduced because the internal face of the container is directly exposed to the outside at the time of the sequent drying.

An eighteenth aspect of the present invention is different from the seventeenth aspect of the present invention. The container is structurally composed of an air tight, water resistant sheet material, and includes a top face portion, a bottom face portion, and a peripheral face portion connecting the top face portion and the bottom face portion. The container is formed with a liquid stirring port having air evacuating means in accordance with an internal pressure and formed at the top face portion, and an injecting and ejecting liquid port which is openable/closable is formed on the peripheral portion in the vicinity of the bottom face. An air tight, water resistant slide fastener is mounted to the peripheral face portion with an exception of a non-opening and closing portion.

A method for washing the thus structured flexible container for liquid transport is characterized by closing the air tight, water resistant slide fastener while the container is empty; forming the container to be in its swelled state; opening the liquid stirring port to jet the washing liquid toward an internal wall of the flexible container via the stirring port; and ejecting the residue adhering to the internal wall and the residual liquid in the container to the outside of the container via the liquid injecting and ejecting port, together with the washing liquid.

According to a nineteenth aspect of the present invention, the washing method further comprises: jetting sterilizing and disinfecting solution toward the internal wall of the flexible container via the liquid stirring port in the same manner after the completion of the washing according to the eighteenth aspect; and ejecting the sterilizing and disinfecting solution to the outside of the container via the liquid injecting and ejecting port and performing finish washing. In general, after finish washing using the sterilizing and disinfecting solution, the residual liquid in the container is washed out. Further, according to a twentieth aspect of the present invention, water may be jetted via the liquid stirring port after the sterilizing and disinfecting solution are ejected, and the water is ejected to the outside of the container via the liquid injecting and ejecting port.

When treatment liquid such as washing liquid is jetted into the container, it is preferable that the treatment liquid is jetted toward the internal wall of the flexible container and at the same time, air is blown from the liquid stirring port, as in the twenty-first aspect of the present invention. Further, when the treatment liquid is ejected to the outside of the container, it is preferable that the bottom face portion side opposite to the liquid injecting and ejecting port is raised when the washing liquid or the like is ejected, and the container is inclined to promote ejection of the washing liquid or the like to the outside of the container, as in a twenty-sixth aspect of the present invention.

According to twenty-seventh and fourth aspects of the present invention, the washing liquid and the sterilizing and disinfecting solution are defined. As the washing liquid, warm water of 40 to 70° C. in temperature is used. As the sterilizing and disinfecting solution, aqueous solution of sodium hypochlorite whose concentration is 300 ppm or less is used.

A twenty-ninth aspect of the present invention is a method for washing a flexible container having the above-mentioned structure which is further different from the washing method according to the nineteenth aspect of the present invention. The method comprises: opening an air tight, water resistant slide fastener of a flexible container after ejecting the transport liquid; spreading out and opening the container with the slide fastener being opened in a direction in which the top face portion and bottom face portion of the flexible container are separated from each other as being fanned out about a basic point at the non-opening and closing portion so that the internal face of the container is exposed to the outside; pre-washing the flexible container exposing the internal face by using washing liquid; performing finish washing for the container using the sterilizing and disinfecting solution; and heating and drying the washed flexible container.

That is, in the present invention, pre-washing and finish washing are performed while the entire container is greatly spread out with its internal wall face being exposed to the outside. Thus, container washing, sterilizing and disinfecting treatment, and drying treatment of the container can be performed successively and efficiently. Moreover, the washing result can be visually checked, so that a clean container can always be used. In particular, sanitary management is facilitated in transporting drinks such as milk or juice.

According to a thirtieth aspect of the present invention, how to spread out the container is specified. That is, The flexible container has, at the periphery of the non-opening and closing portion, container suspending pieces at least at two positions of the peripheral edge of the top face portion, and bottom face portion fixing pieces at least at two positions of the peripheral edge of the bottom face portion. When the container suspending pieces and the bottom face portion fixing pieces are pulled up so as to be drawn to each other, the flexible container is automatically spread out and opened.

According to a thirty-first aspect of the present invention, it is defined as to how to perform pre-washing using the washing liquid and finish washing using the sterilizing and disinfecting solution or the like. The pre-washing and finish washing are performed by immersing the flexible container at least in the washing liquid and the sterilizing and disinfecting solution, or by jetting the washing liquid and the sterilizing and disinfecting solution toward the flexible container.

According to thirty-second and thirty-fourth aspects of the present invention, the washing liquid and the sterilizing and disinfecting solution are defined. As the washing liquid, warm water of 40 to 70° C. in temperature is used. Alternatively, aqueous solution in which alkali detergent of 3 to 7 wt. % is further added to the warm water may be used. As the sterilizing and disinfecting solution, aqueous solution of sodium hypochlorite whose concentration is 300 ppm or less is used.

According to the thirty-fifth aspect of the present invention, as has been described hereinbefore, it is defined that temporary washing is performed before the washing method according to the sixteenth or twenty-first aspect is performed. That is, this temporary washing comprises: forming the flexible container to be in its swelled state after the transport liquid has been ejected before washing; injecting the washing liquid from the liquid injecting and ejecting port; ejecting the air in the container via air evacuating means of the liquid stirring port as injection quantity of the washing liquid increase; and ejecting the washing liquid from the liquid injecting and ejecting port to the outside together with the residual liquid of the transport liquid after the injection quantity of the washing liquid has reached its predetermined charge quantity.

Further, in a flexible container of this type, after the internal transport liquid is transported to a destination, and is ejected there, the container is folded and brought back home. In this state, mold is likely to occur in the residual liquid in the container, which makes the subsequent wash cumbersome, and it is not preferable from the sanitary point of view. Therefore, it is desirable that temporary washing is performed before performing the subsequent main washing immediately after the internal transport liquid has been transported to a destination and replaced in another container.

According to the thirty-fifth aspect of the present invention, a flexible container before the main washing is performed and after the transport liquid has been ejected is formed to be in a wrinkle free, swelled state immediately after the ejection of the transport liquid, and the washing liquid is injected from the liquid injecting and ejecting port. At this time, the air in the container is evacuated via the air evacuating means of the liquid stirring port as the injection quantity of the washing liquid increase. After the injection quantity of the washing liquid has reached its predetermined charge quantity, the washing liquid is ejected from the liquid injecting and ejecting port to the outside together with the residual liquid of the transport liquid, so that the temporary washing is completed. As another air evacuating means, a pressure relief valve for example, may be employed. If the air in the container is not evacuated during this temporary washing, the internal pressure of the container increases excessively, whereby the container and the air tight, water resistant slide fastener mounted to the peripheral face portion thereof may be damaged.

According to a thirty-sixth aspect of the present invention, after the washing liquid used for the temporary washing has been ejected, the flexible container is folded, while the internal residual liquid is introduced into the liquid injecting and ejecting port so as to be squeezed, so that the residual liquid is ejected from the liquid injecting and ejecting port. In this temporary washing, as has been described hereinbefore, the transport liquid is replaced from the flexible container to another container at a destination, and the flexible container is temporarily washed on the site. Therefore, the temporarily washed flexible container is loaded on a transport vehicle, and transported back. At this time, if this flexible container is loaded on the transport vehicle while it is spread out, the other materials cannot be loaded. Therefore, after the temporary washing has completed, the flexible container is, of course, folded, and is stored in a place free of problems with shipment. In the present invention, when the container is thus folded so as to introduce the residual liquid in the container to the liquid injecting and ejecting port, most of the residual liquid in the container is automatically ejected from the liquid injecting and ejecting port.

According to a thirty-seventh aspect of the present invention, there is provided an equipment for washing a flexible container for liquid transport having the above structure, which is divided into a washing area and a drying area for the flexible container. The equipment comprises: guide passages overhung between the washing area and drying area for suspending and guiding the flexible container; and suspending and moving means for the flexible container for guiding and moving it to the guide passage. This washing equipment is primarily preferable in implementing the washing method according to the twenty-ninth aspect. However, as is evident from the aforementioned description, according to the equipment, both of the washing methods as described in the aforementioned seventeenth and eighteenth aspects can be effectively implemented.

According to a thirty-eighth aspect of the present invention, the guide passage is further extended to a storage area for the flexible container. The washed and dried flexible container is folded in its required shape, and is stored in the storage area.

According to a thirty-ninth aspect of the present invention, the washing equipment is preferable in implementing the washing method according to the eighteenth aspect of the present invention. The washing area has container forming means for forming an empty flexible container to be in its swelled state. According to a fortieth aspect, it is defined that the container forming means is a blower for blowing air into the container.

According to a forty-first aspect of the present invention, the washing area has a washing base having an inclined top face on its top face for placing the flexible container in such a position that the liquid injecting and ejecting port is at a lower side of the inclined face. Therefore, in this case, the flexible container before being washed is mounted to the washing base in such a position that the liquid injecting and ejecting port is at the lower side of the inclined face. By performing the aforementioned subsequent operations, the waste liquid of the washing and finish washing can be ejected smoothly to the outside of the container.

Further, in a forty-second aspect of the present invention, in the washing area, a jetting nozzle to be inserted into the liquid stirring port of the flexible container for radiantly jetting the washing liquid toward the internal wall of the container is provided so as to implement the washing method according to the eighteenth aspect easily and certainly.

On the other hand, in a forty-third aspect of the present invention, an equipment preferable to the washing method according to the twenty-ninth aspect is defined, in which the washing area comprises a washing liquid vessel and a sterilizing and disinfecting solution vessel for immersing the flexible container.

According to a forty-aspect of the present invention, in implementing the washing method according to the eighteenth and twenty-ninth aspects of the present invention, the washing area further comprises a jetting nozzle for jetting warm water of 40 to 70° C. Thus, the inside of the container can be washed, and at the same time, the external face of the container is washed by way of the jetting nozzle. In order to apply the present invention to implementation of the washing method according to the eighteenth aspect, an empty container having the transport liquid ejected therefrom is formed in its shape, and then, warm water is jetted toward the external face of the container. When the present invention is applied to the washing method according to the twenty-ninth aspect, the warm water is jetted toward the external face of the spread out container before being transferred to the above washing liquid vessel. During this jetting, under a normal efficient jetting pressure, it is desirable that warm water is jetted while the jetting nozzle is spaced at least by 1 m from the external face of the container.

According to a forty-fifth aspect of the present invention, there is provided an equipment for achieving efficient jet washing toward the internal wall face of the flexible container in implementing the washing method according to the eighteenth and twenty-ninth aspect, the equipment comprising a tank for housing the washing liquid, the sterilizing and disinfecting solution, and warm water in the washing area; and jetting nozzles connected to each tank via a three-way switching valve. According to the jetting nozzle having such a structure, the pre-washing using washing liquid and finish washing using sterilizing and disinfecting solution, and final washing using warm water can be implemented with a single nozzle by switching at least a 5-port switching valve.

According to forty-sixth and forty-eighth aspects of the present invention, it is defined that a sterilizing and disinfecting lamp or an ozone generator may be provided in the drying area besides a hot air heater and a hot air blowing fan. Such an equipment is preferable particularly for a container for transport of liquid used for food, from a sanitary point of view.

EMBODIMENTS OF THE INVENTION

Hereinafter, a first embodiment of the present invention will be specifically described with reference to the accompanying drawings.

Figure 1:
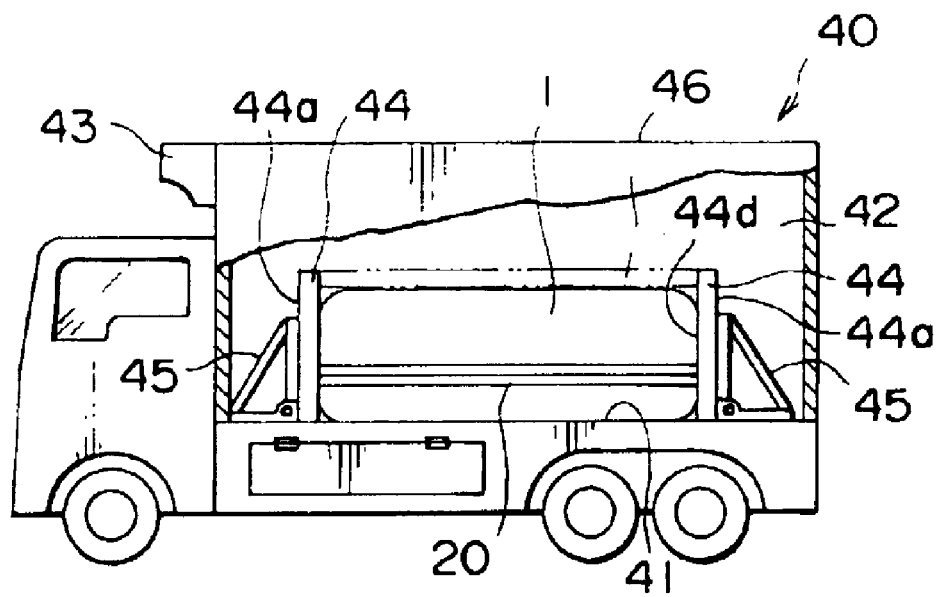
FIG. 1 is a side view showing a first typical embodiment of a liquid transport apparatus, partially cut out, according to the present invention.
Figure 2:
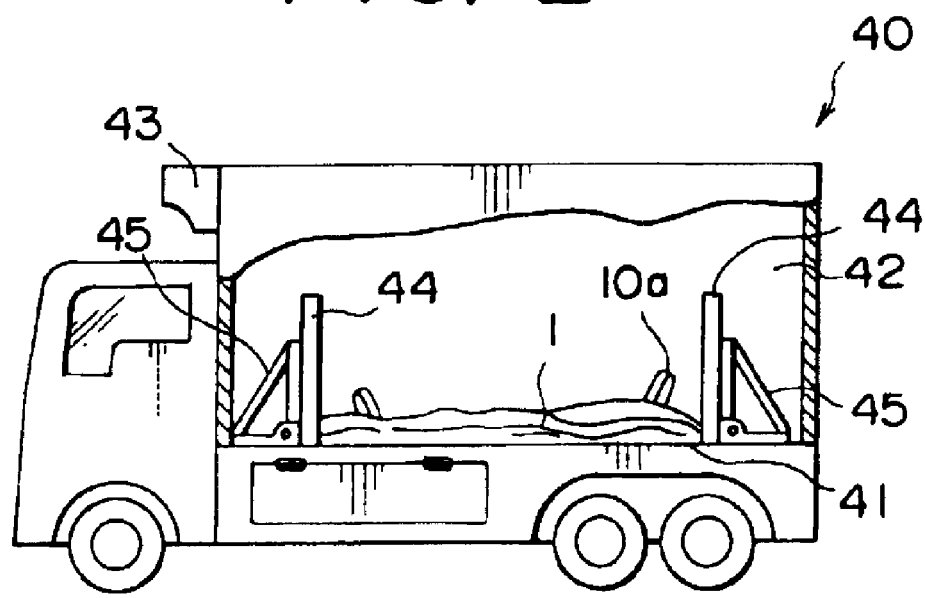
FIG. 2 is a side view showing a state where a contracted flexible container before liquid injection is loaded on a carriage in the liquid transport apparatus partially cut out.
Figure 3:
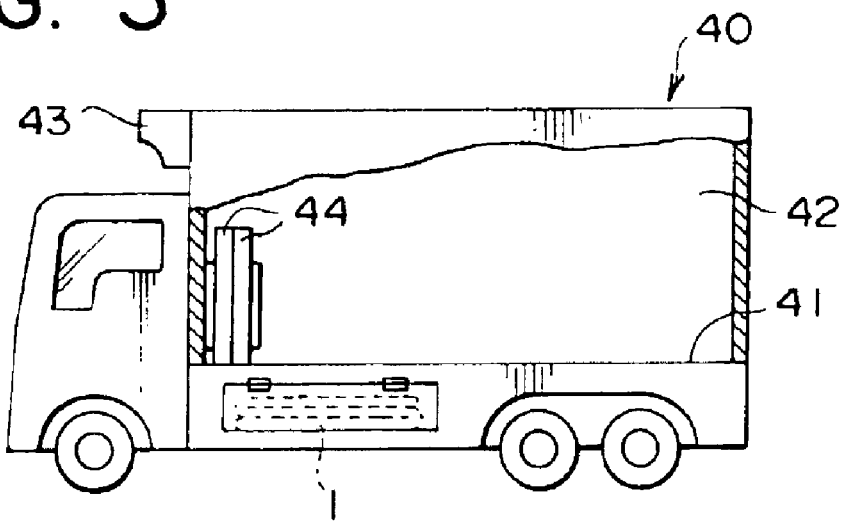
FIG. 3 is a side view showing a state of the liquid transport apparatus, partially cut out, where the flexible container is folded and stored.

FIG. 1 to FIG. 3 are side views each showing an example of a first liquid transport apparatus, partially cut out, using a typical flexible container 1 for liquid transport according to the present invention. FIG. 1 shows a vehicle for loading the flexible container filled with liquid on a carriage and transporting the container. FIG. 2 shows a transport vehicle with a contracted empty flexible container before liquid charge is loaded. FIG. 3 denotes the transport vehicle when the flexible container in its folded state has been stored.

A liquid transport vehicle 40 that is one of constituent elements of a liquid transport apparatus according to the present invention comprises a storage chamber 42 for storing and loading the flexible container 1 on a carriage 41. Usually, an inside of the chamber is being cooled by a cooler 43. A pair of support wall portions (bulk heads) 44 having rigidity and strength are respectively provided at the front and rear of the carriage 41.

Each of the support wall portions 44 is composed of a panel made of steel plate-shaped panel for example, and is movable in the forward and backward direction along a surface of the carriage 41. A support bracket 45 is removably mounted on a back face 44a of one of the support wall portions 44. When liquid is transported by the flexible container 1, the support wall portion 44 is made to be in its erecting position as described previously. After the flexible container 1 is folded after having been transported with the liquid and is stored in the storage chamber 42 of the vehicle, the support brackets 45 are removed from the support wall portions 44. Then, the support wall portions 44 are moved forwardly along the surface of the carriage 41 as shown in FIG. 3, and then, is fixed to a rear wall face of a driving chamber by suitable fixing means such as a hook.

At upper end edges of a pair of the front and back support wall portions 44, both ends of a holding bar 46 are removably fixed by fixing means such as bolts in order to hold the flexible container 1 filled with liquid from above and to stabilize the shape of the flexible container 1 during transportation.

Figure 4:
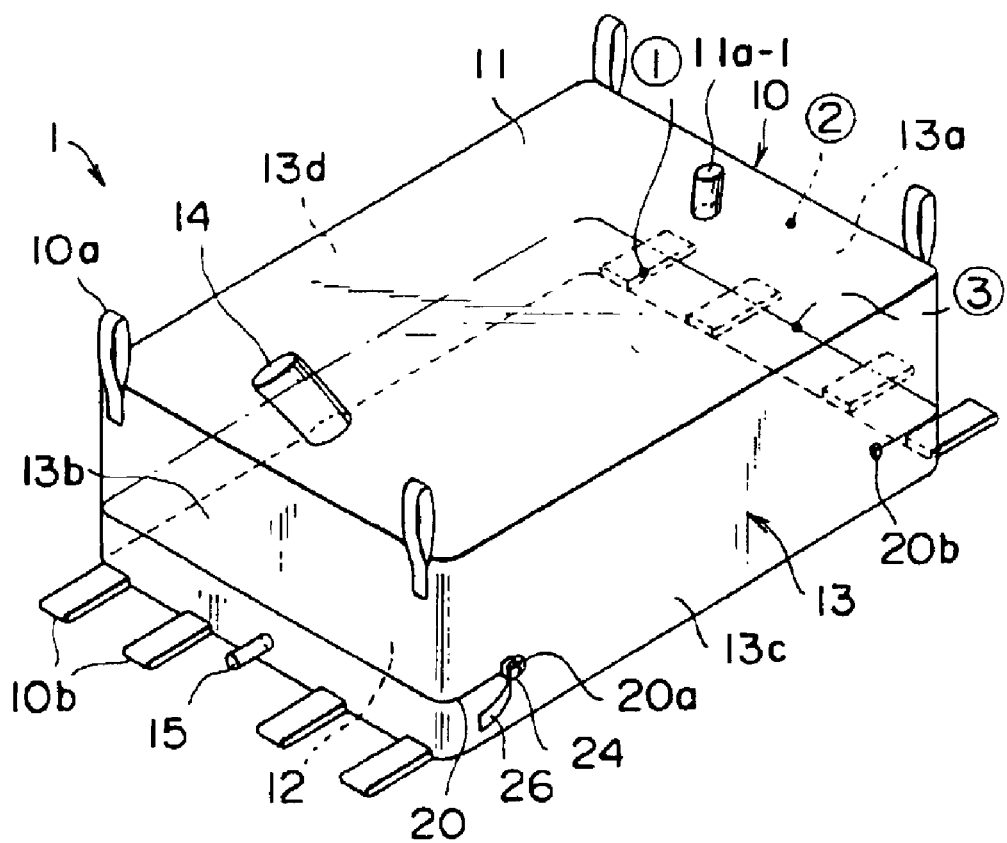
FIG. 4 is a perspective view schematically showing the first typical embodiment of the flexible container for liquid transport according to the present invention.
Figure 5:
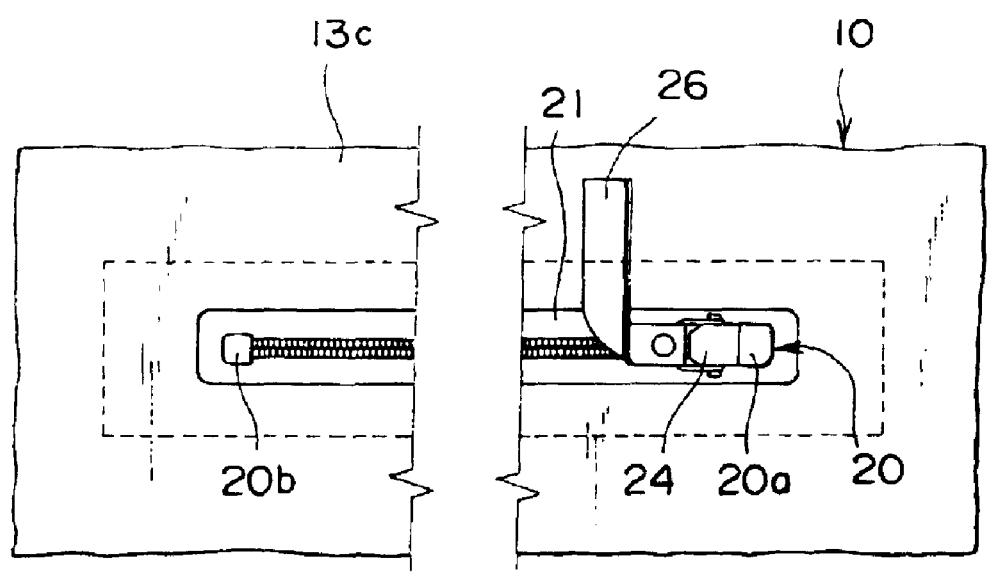
FIG. 5 is a front view showing an end mounting portion of an air tight water resistant slide fastener mounted to the container.

FIG. 4 is a perspective view schematically illustrating an appearance of a first example of the flexible container that is a typical embodiment of the present invention; and FIG. 5 is a plan view schematically illustrating an embodiment in which an end of an air tight, water resistant slide fastener of the container is mounted.

A flexible container main body 10 according to the embodiment is composed of an elastic sheet material on which a fiber reinforce layer is coated with polyurethane resin. The container main body 10 consists of a rectangular top face portion 11; a rectangular bottom face portion 12 which is similar to the top face portion 11; and a peripheral face portion 13 connecting the top face portion 11 and the bottom face portion 12. The peripheral face portion 13 is entirely formed in a widthwise elongated three-dimensional shape composed of a front face portion 13a, rear face portion 13b, and a left and right pair of first and second side face portions 13c and 13d.

A cylindrical air exhaust port 11a-1 is protruded at a center close to a front face portion of the top face portion 11 of the flexible container main body 10, and a cylindrical stirring port 14 is protruded at a position close to a rear face portion of the top face portion 11. In this embodiment, the air exhaust port 11a-1 and the stirring port 14 are made of similar materials in order to ensure good familiarity with the container main body 10. However, these portions can be made of metal or hard synthetic resin material. When these ports are closed, a sealing cap or plug may be removably mounted thereon in the case of such hard material. In a case of soft material, metal fittings (not shown) such as a spring clip for closing an end of a hose or the like may be used. Furthermore, at a center of a lower end of the rear face portion 13b of the container main body 10, a liquid injecting and ejecting port 15 for liquid transport is protruded. A hose or the like (not shown) is connected from outside to this liquid injecting and ejecting port 15 during liquid injection or ejection.

Further, flexible suspending pieces 10a are made of looped tapes are mounted at four upper corners of the flexible container main body 10, respectively. The suspending pieces 10a are employed when a contracted flexible container main body 10 is swelled to the original shape. Specifically, the flexible container main body 10 having the air tight, water resistant slider fastener 20 closed, as shown in FIG. 2, is loaded on the carriage 41 of a vehicle while the main body 10 is contracted. Prior to liquid injection, air is blown in the container main body 10 so that the container is swelled to the original shape. The suspending pieces 10a are used to lift an upper portion of the container main body 10 by being pulled up manually or by a crane in order to facilitate air entry into the container main body 10.

Figure 6A:
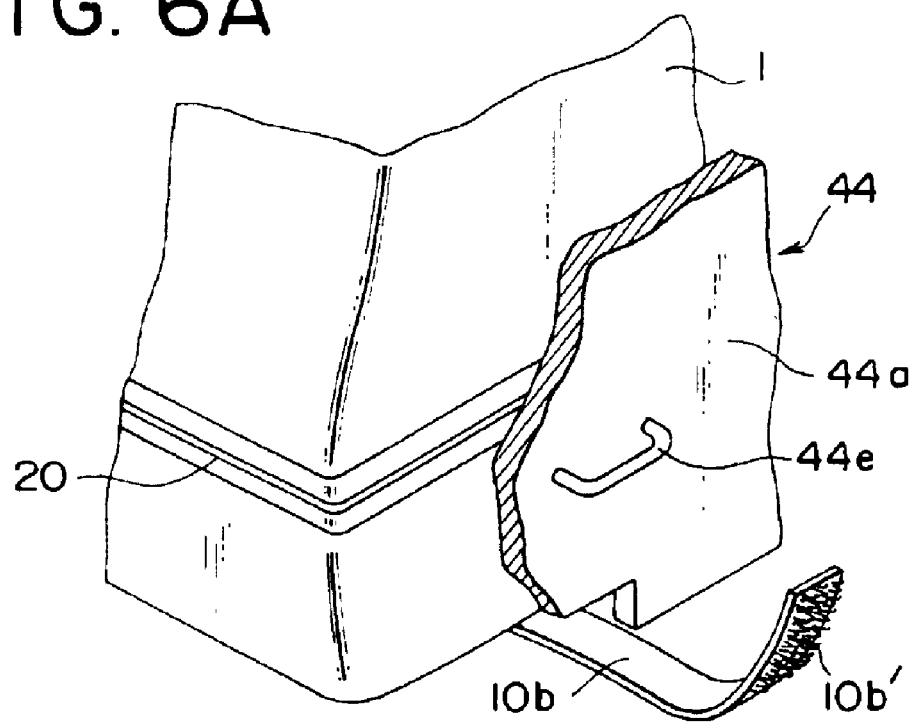
FIGS. 6A and 6B are explanatory views partially showing an example of a fixing structure of a bottom face portion of the flexible container according to the present invention.
Figure 6B:
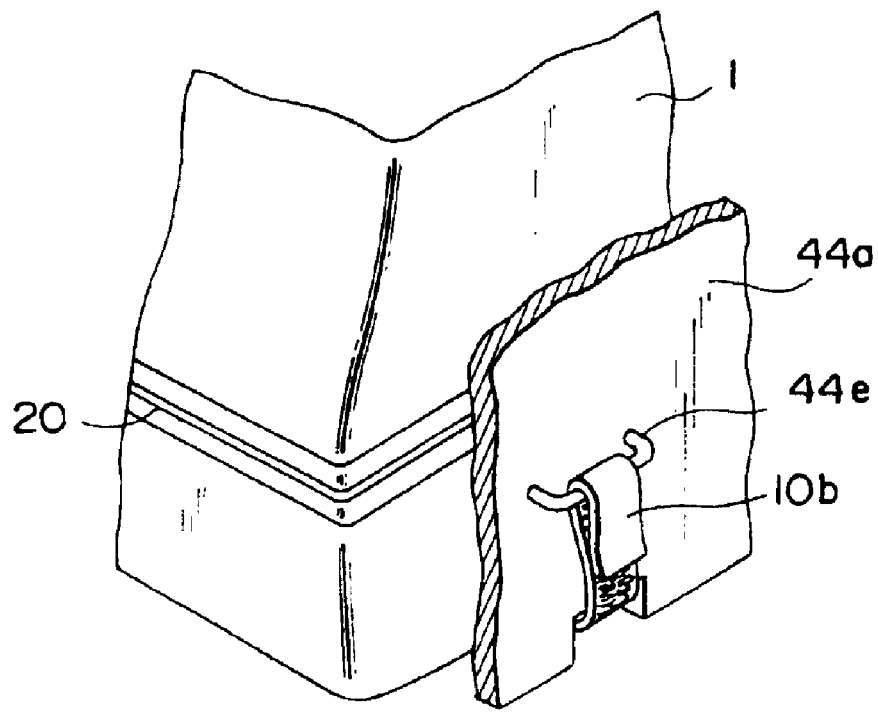

Further, at lower end edges of the front face portion 13a and rear face portion 13b of the flexible container main body 10, four bottom face portion fixing pieces 10b comprising engagement portions of the surface fastener all over respective band-shaped tape are mounted. FIGS. 6A and 6B show a preferred embodiment in which the bottom face portion 12 of the flexible container main body 10a is engagingly fitted to the support wall portion 44 by means of the bottom face portion fixing pieces 10b. As shown in FIG. 6A, a surface fastener engagement portion 10b' in which male engagement elements and female engagement elements coexist are coexisted at the lower face of the bottom face portion fixing pieces 10b. A plurality of hooking portions 44e are mounted along the lower end edge of the rear face 44a of one of the support wall portions 44. The bottom face portion fixing pieces 10b, as shown in FIG. 6B, are wound around the hooking portions 44e of the forward and backward support wall portions 44 placed on the carriage 41 of the vehicle 40.

Thus, the surface fastener engagement portion 10b' are fixed by being face-to-face engaged.

Figure 13:
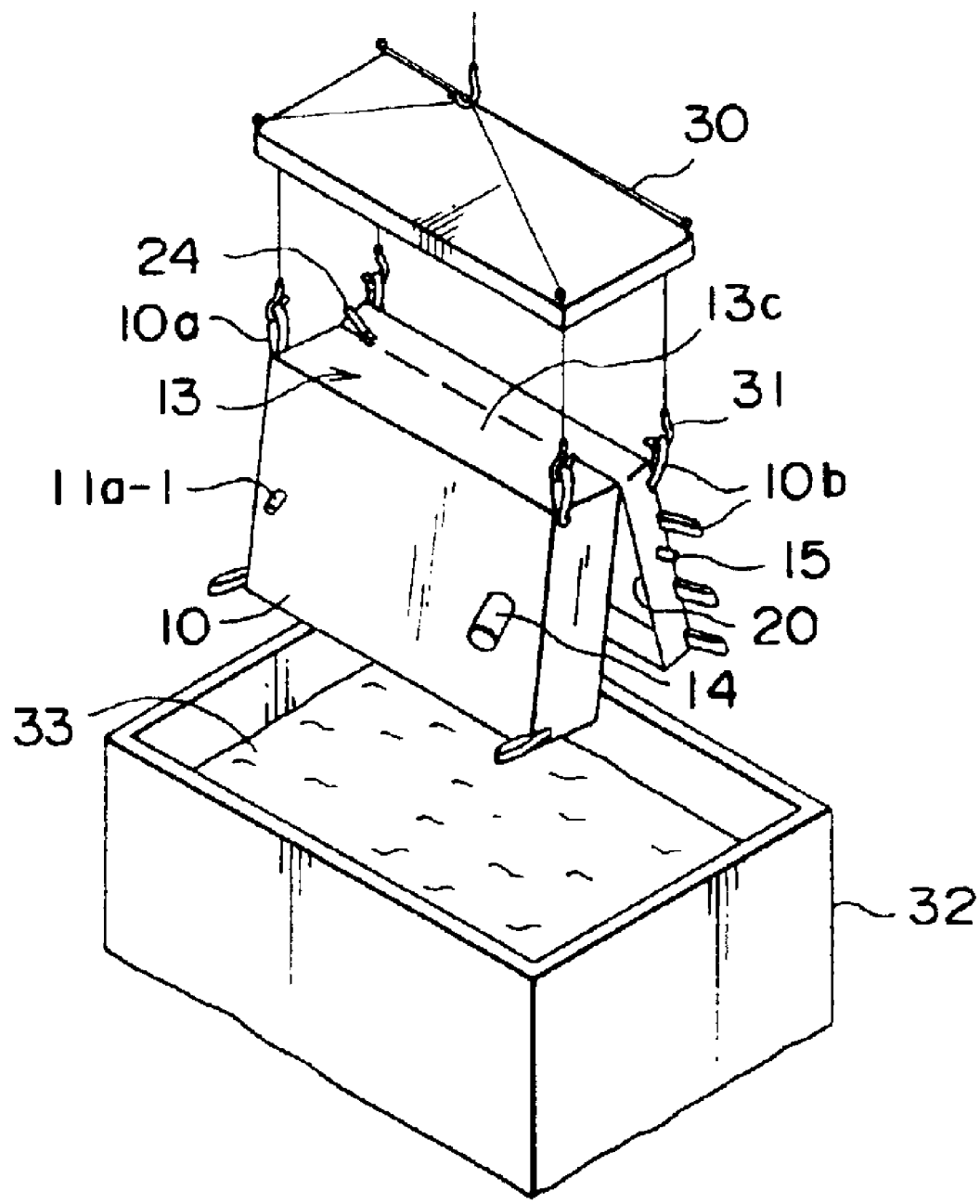
FIG. 13 is a perspective view showing an embodiment of a washing and sterilizing treatment process of the flexible container.
Figure 14:
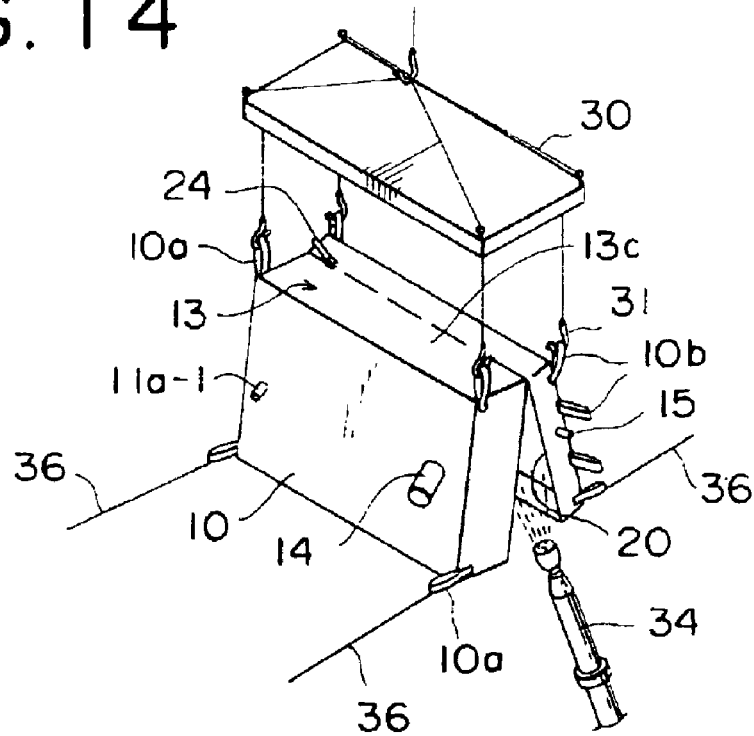
FIG. 14 is a perspective view showing another embodiment of the washing and sterilizing treatment process.

The suspending pieces 10a and the bottom face portion fixing pieces 10b may be employed for suspension on a hook 31 of a crane 30 as shown in FIG. 13 or FIG. 14 when the air tight, water resistant slide fastener 20 is opened to spread out the flexible container main body 10 in order that the container 1 is subjected to washing, sterilizing or drying treatment.

Figure 7:
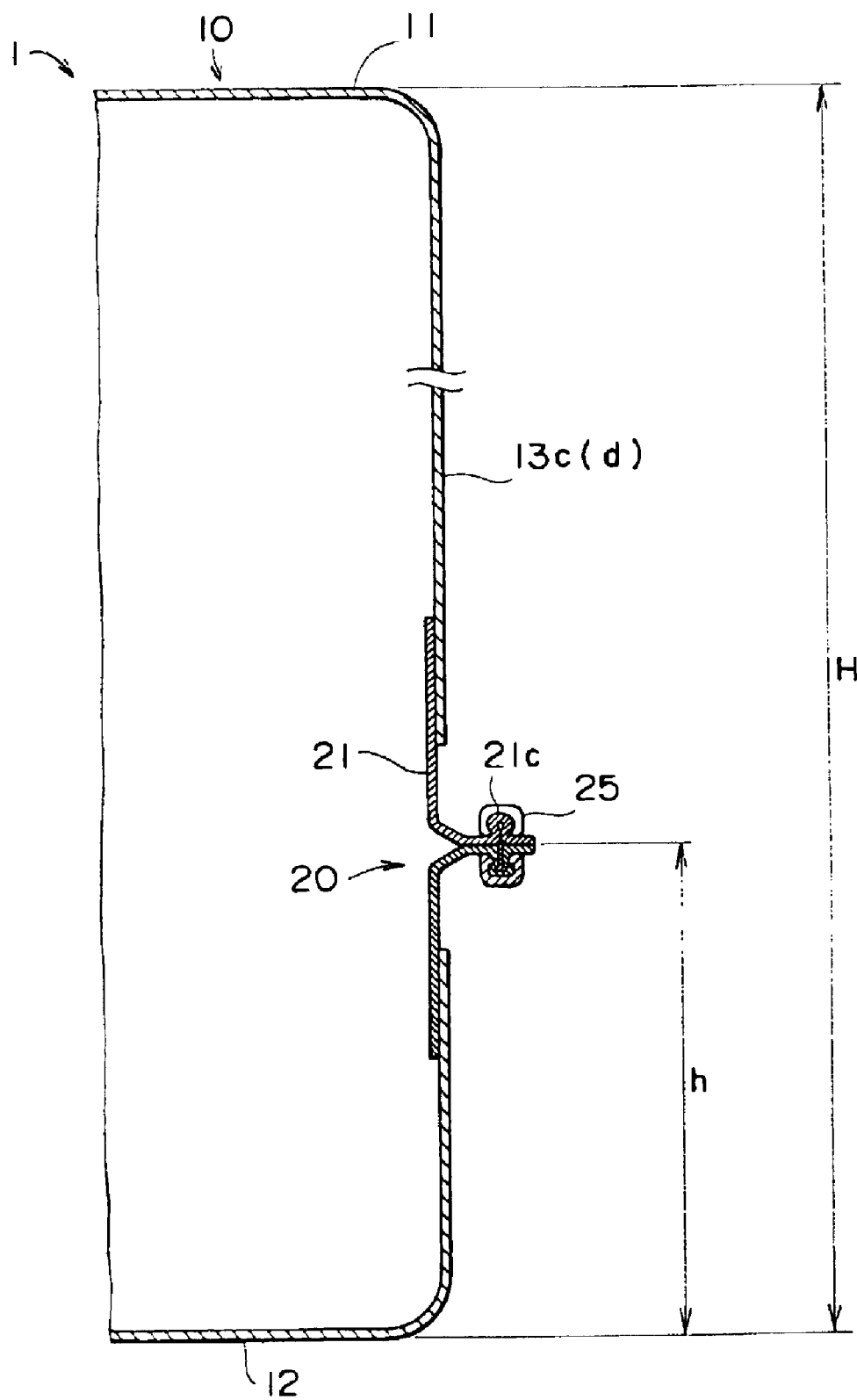
FIG. 7 is a partial cross section showing an example of an air tight water resistant slide fastener for the flexible container according to the present invention.

In the present invention, particularly the mount position of the air tight, water resistant slide fastener 20 is important. FIG. 7 shows a relationship of its mount position. Referring to the figure, the air tight, water resistant slide fastener 20 is set at a position of a height h that is substantially ⅓ of a total height h of the container from the bottom face portion 12. The air tight, water resistant slide fastener 20 is continuously mounted all over the front face portion 13a, left side face portion 13d, and rear face portion 13b of the peripheral face portion 13 of the container main body 10. As shown in FIG. 4, ends of the air tight, water resistant slide fastener 20 are extended to an inward position by a predetermined length from the front face portion 13a and the rear face portion 13b to the respective forward and backward end portions of the right side face portion 13c. An upper stopper 20a and a lower stopper 20b of the air tight, water resistant slide fastener 20 are attached respectively at the extension positions of the right side face portion 13c.

Figure 8A:
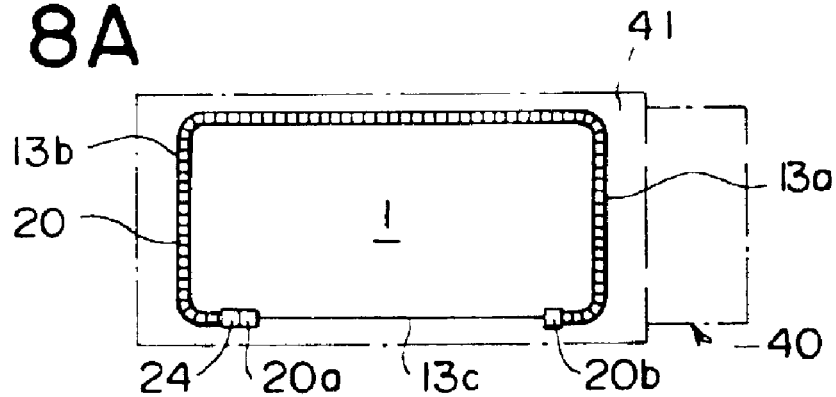
FIGS. 8A–8D are plan views showing an example of mounting of another air tight water resistant slide fastener to the flexible container according to the present invention.
Figure 8B:
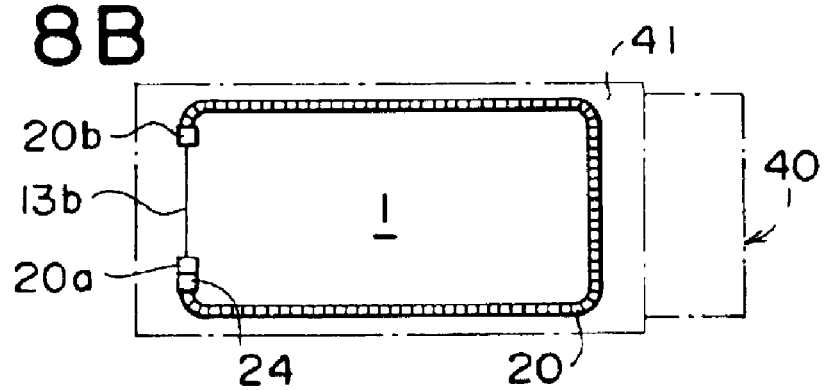
Figure 8C:
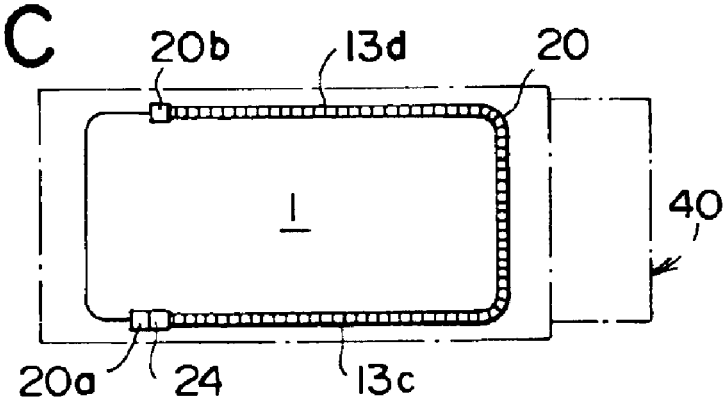
Figure 8D:
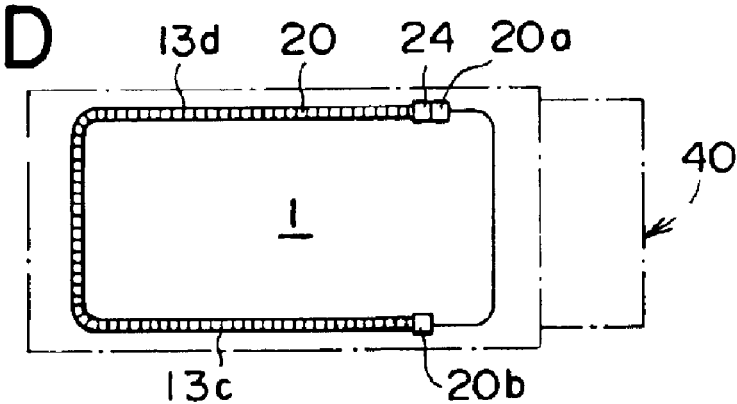

FIG. 8A to FIG. 8D each show an example of various extension positions of the air tight, water resistant slide fastener 20 according to the present invention. The upper stopper 20a and lower stopper 20b of the air tight, water resistant slide fastener 20, as shown in the example of FIG. 4, i.e., as shown in FIG. 8A, are not limited to the right side face portion 13c of the flexible container main body 10. As shown in FIG. 8B to FIG. 8D, the left side face portion 13d and the rear face portion 13b may be available. Alternatively, the upper stopper 20a and the lower stopper 20b may be mounted separately to the right side face portion 13c and the left side face portion 13d.

However, the upper stopper 20a and the lower stopper 20b are the most easily subjected to a shocking load during liquid transport. In particular, it is preferable to avoid mounting them to the front face portion 13a. In the embodiment shown in FIG. 4, the stops 20a and 20b are respectively disposed at the forward and backward end sides of the right side face portion 13c of the container main body 10 because the largest load is applied to the front and rear face portions 13a and 13b of the container main body 10 during liquid transport. In particular, if the stops 20a and 20b are disposed at the front face portion 13a to which a large shocking load acts at a sudden stoppage, the stops 20a and 20b are easily damaged at an early stage.

According to the experiments, the aforementioned container 1 having a shape as shown in FIG. 4, the size of which is 4290 mm in length×2290 mm in width×1140 mm in height is employed. In a state that liquid of 11 m³ is contained and sealed therein, stresses acting to the container during transport at positions indicated in ①  to ③ shown in the figure were analyzed. Then, the result as shown in FIG. 36 was obtained.

Figure 36:
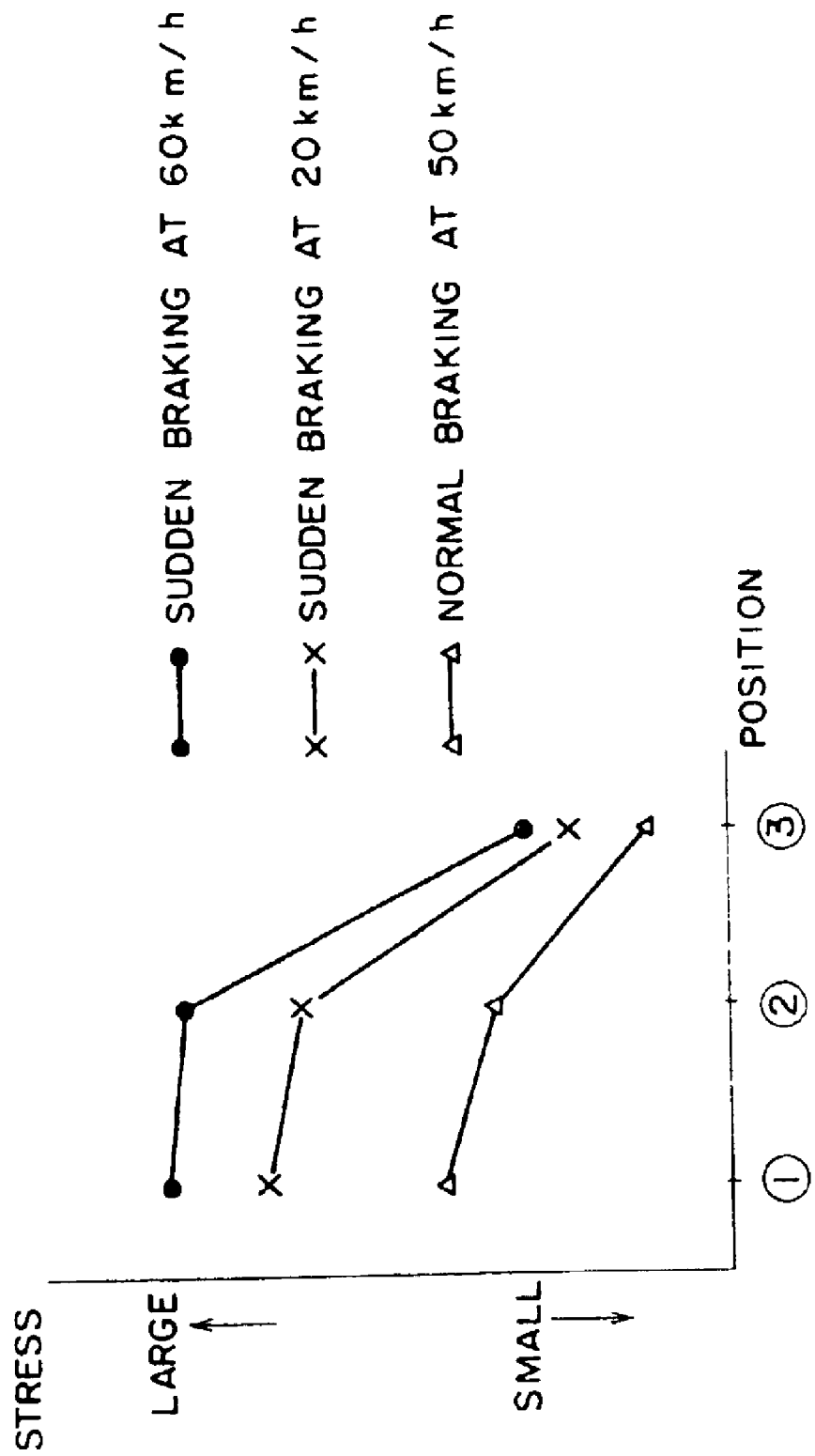
FIG. 36 is an explanatory view showing a relationship between an measurement position of the container and a stress acting to the position based on liquid movement when the liquid is being transported using the flexible container.

As can be understood from FIG. 36, the largest stress is applied to the position ① which is close to the front face portion 13a of the container top face portion 11. The second largest stress is applied to the position ② of the front face portion 13a which is 200 mm downward from the container top portion 11. The least stress is applied to the position ③ of the front face portion 13a which is 200 to 300 mm upward from the container bottom face portion 12. In particular, in comparison with the other positions, the extremely small stress is applied to the position ③ of the front face portion 13a which is 200 to 300 mm upward from the container bottom face portion 12, which is substantially ⅓ of the position ① close to the front face portion 13a of the container top face portion 11.

From this analysis results, it is found that, when the air tight, water resistant slide fastener 20 is mounted to the flexible container 1 at a position close to the lower side rather than upper side, a sudden change in stress caused by a sudden braking for example during liquid transport is small, and a transverse pulling force acting to the crossing direction of the air tight, water resistant slide fastener 20 can be reduced. The mount position of the airtight, water resistant slide fastener 20 is determined depending on use frequency of the container 1, the braking count during liquid transport (general braking and sudden braking counts), service life of the container 1, the service life of the air tight, water resistant slide fastener or the like. Therefore, it cannot be defined uniformly. As shown in FIG. 7, it is preferable that the mounting is performed at the position where the mount height h from the bottom face portion 12 of the container main body 10 is at least a height position which is ½ or less of the total height H.

Figure 9:
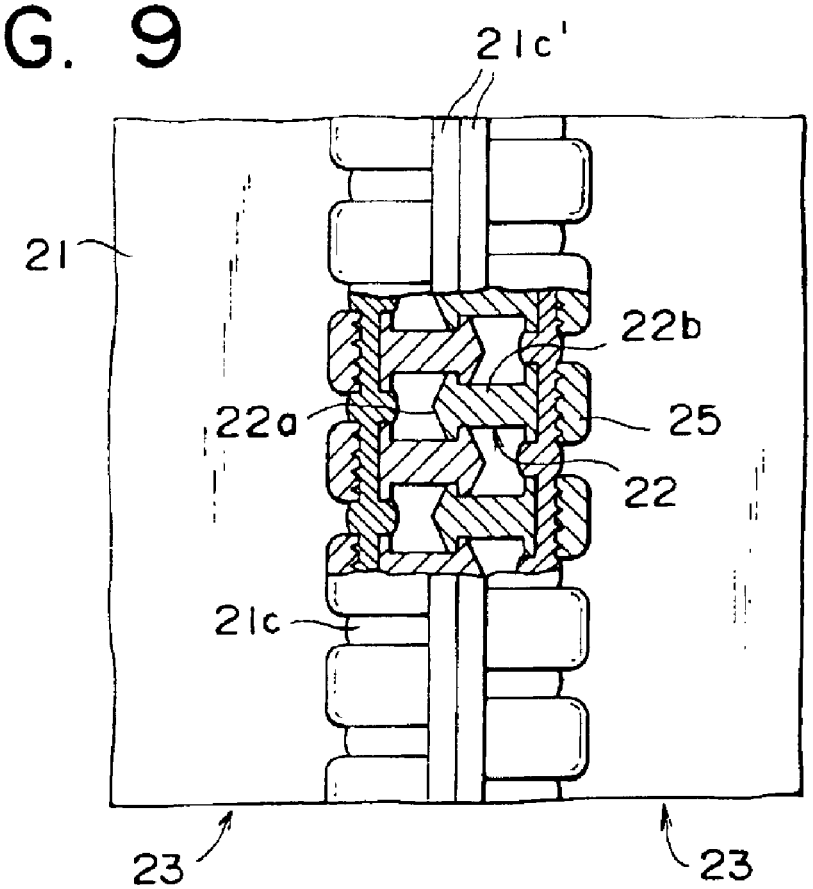
FIG. 9 is a plan view showing a state where an air tight water resistant slide fastener, partially cut out, applied to the container is coupled and closed.
Figure 10:
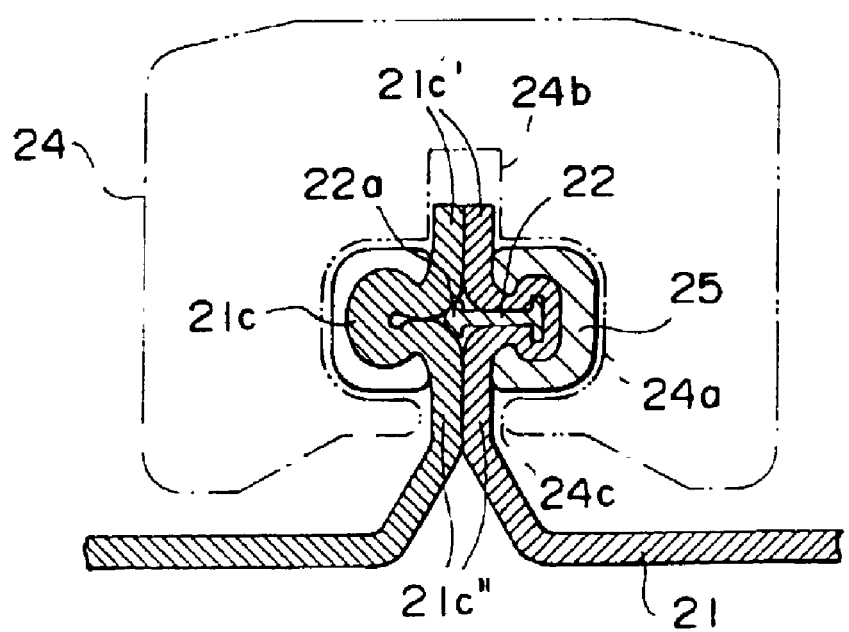
FIG. 10 is a cross section of the air tight water resistant slide faster.

The structures and mounting embodiments of the air tight, water resistant slide fastener 20 are shown in FIG. 7, FIG. 9, and FIG. 10. As can be understood from these figures, the air tight, water resistant slide fastener 20 comprises a pair of fastener stringers 23, 23 in which side edges of water resistant tapes 21 made by coating elastic water resistant layers such as of polyurethane resin onto fibrous base cloth are bent and fixed in a substantial transverse Ω shape, and teeth 22 are mounted to the bent portions 21c; and a slider 24 for engaging and disengaging the opposite teeth 22, and for tight-contacting and separating opposite vertical portions 21c' and 21c" from each other. The water resistant layer may be made of a variety of synthetic rubbers, polyvinyl chloride resin or the like, besides polyurethane resin as mentioned above.

The substantially transverse Ω shaped bent portions 21c constitute tooth holding portions. Each of the tooth holding portions holds a leg portion 22b of a tooth 22 so that its coupling head 22a protrudes. Furthermore, the bent portion 21c is pinched by a C shaped tooth clamp 25 from outside to pinch and fix the tooth 22. Upper and lower ends of the bent portion 21c extend substantially vertically in flat shape. When the teeth 22 are engaged with one another, the corresponding portions of the mating teeth come into contact with each other so as to constitute an air tight, water resistant structure.

The air tight, water resistant slide fastener 20 is opened and closed by sliding operation of the slider 24. At this time, the teeth 22 are guided in such a manner that the outsides of the bent portions 21c for fixing the teeth 22 are introduced by a guide passage 24a of the slider 24 as shown in FIG. 10. The guide passage 24a of the slider 24 serves to guide mutually opposed vertical portions 21c' and 21c" of the bend portions 21c. Thus, as shown in FIG. 10, a guide grove 24b and a slit 24c are formed respectively on a ceiling face and bottom face portion of the slider 24.

Figure 11:
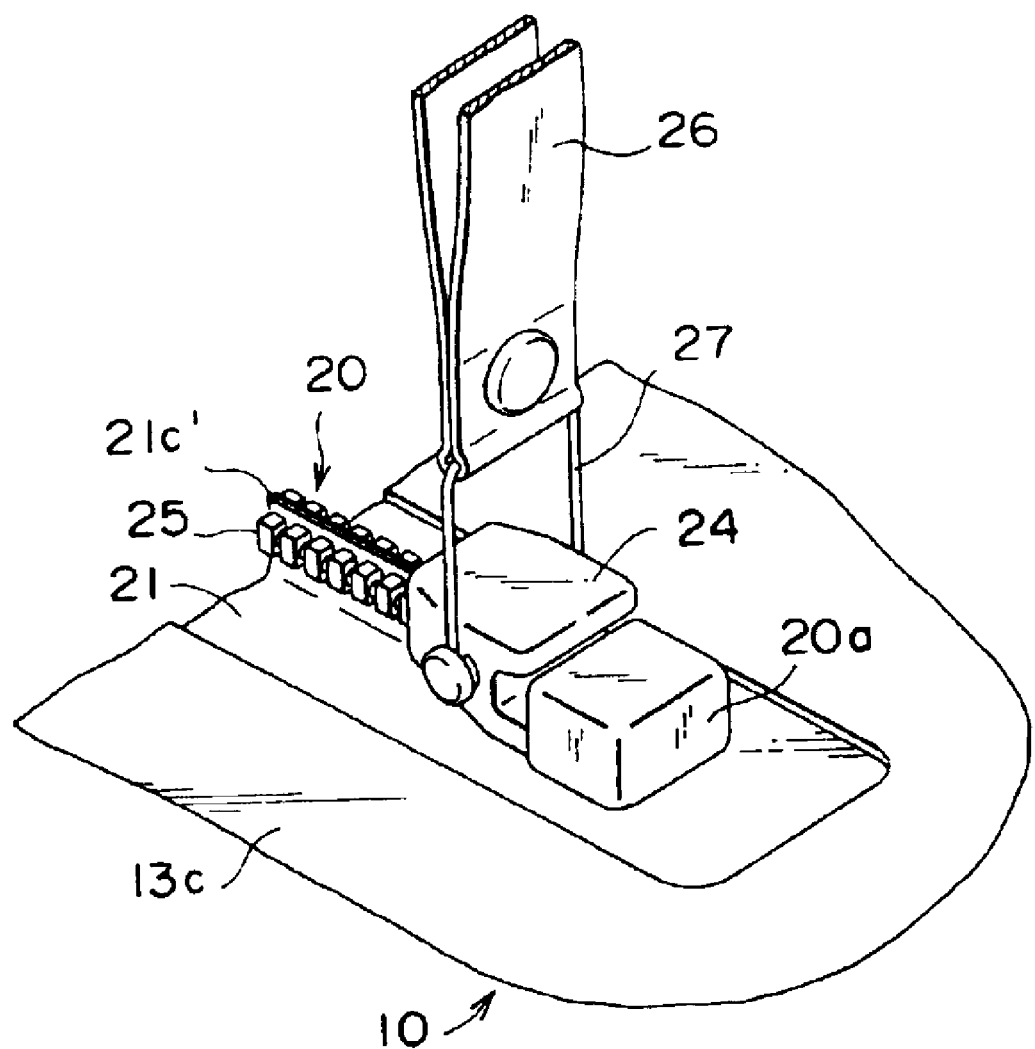
FIG. 11 is a partial perspective view showing a positional relationship between a slider and an upper stopper when the air tight water resistant slide fastener is closed.

Furthermore, a connecting ring 27 with a pull tab 26 is pivotally mounted to the slider 24 as shown in FIG. 11. When the air tight, water resistant slide fastener 20 is closed by closing operation of the slider 24, the slider 24 abuts against a rear face of the upper stopper 20a.

Figure 12:
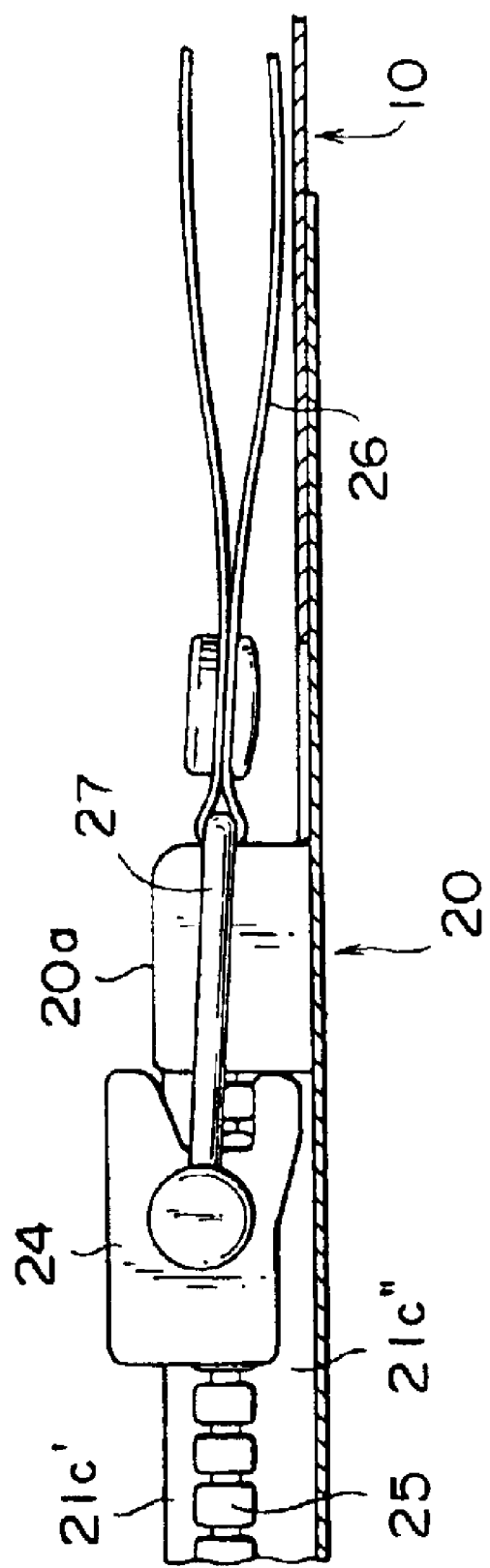
FIG. 12 is a partial side view showing a state where the slider is engagingly fitted to the upper stopper, partially cut out.

After this abutment, the connecting ring 27 is turned so as to be engagingly fitted to a front face of the upper stopper 20a as shown in FIG. 12. In this manner, the slider 24 is prevented from moving spontaneously due to liquid movement or vehicle vibration during liquid transport.

Further, the air tight, water resistant slide fastener 20 is preferably mounted to the container main body 10 through high-frequency fusing or ultrasonic fusing rather than sewing in order to ensure air-tightness and water-residence. In the case of such fusing, it is preferable that the same thermoplastic resin is employed because higher affinity increases the fusing strength. In the embodiment, polyurethane resin is used as a coating material for the water resistant tape 21, and also polyurethane resin is used as a resin material for coating a fiber reinforce layer constituting the container main body 10. Of course, in the present invention, the coating materials for the water resistant tape 21 and the materials for coating the fiber reinforce later are not limited to such polyurethane resin. It is possible to use another thermoplastic synthetic resin material as described previously.

FIG. 13 shows an embodiment in which a flexible container main body 10 having the above structure is subjected to washing or sterilizing treatment.

In the container main body 10 according to the above-described embodiment as described previously, the air tight, water resistant slide fastener 20 is peripherally mounted on the peripheral face portion 13 of the container main body 10 up to the forward and backward ends of the right side face portion 13c thereof. When the air tight, water resistant slide fastener 20 is opened by the slider 24, the container main body 10 is spread out in a substantially reverse V shape via the right side face portion 13c so as to expose the internal face of the container to the outside. In such a state, the suspending pieces 10a and bottom face portion fixing pieces 10b mounted to the right side face portion 13c side of the container main body 10 are utilized to be hooked and suspended on a hook 31 of a crane 30. Then, the crane 30 is lowered, and the spread out container main body 10 is immersed in washing liquid 33 in a washing treatment vessel 32, whereby the washing is performed.

In this manner, the container main body 10 can be washed and sterilized at one time while the container 10 is spread out. Further, when the container is moved to a next drying step, the crane 30 is moved, thereby making it possible to easily move the container 10. Moreover, draining of the liquid in the container main body 10 can be achieved on the way of its movement, and thus the drying efficiency is improved.

In such a washing or sterilizing treatment, not only the container main body 10 is entered into the treatment vessel 32, but also the washing liquid or sterilizing solution may be jetted to the spread out inside of the container main body 10 by a jetting nozzle 34 as shown in FIG. 14.

Reference numeral 36 in the figure denotes a tensile rope removably connected to the suspending piece 10a and the bottom face portion fixing piece 10b. If this tensile rope 36 is pulled in left and right directions, the container main body 10 can be positively spread out, whereby washing or sterilizing treatment can be facilitated.

In the meantime, in a case of a slider structure as shown in FIG. 11, if the slider 24 is merely engagingly fitted onto the upper stopper 20a via the connecting ring 27, the connecting ring 27 may slip off from the upper stopper 20a due to liquid movement during liquid transport or vehicle vibration. As a result, the slider 24 and the upper stopper 20a tend to come into non-contact with each other, so that the end of the upper stopper 20a side of the air tight, water resistant slide fastener 20 may open and a liquid leakage can occur.

Figure 15:
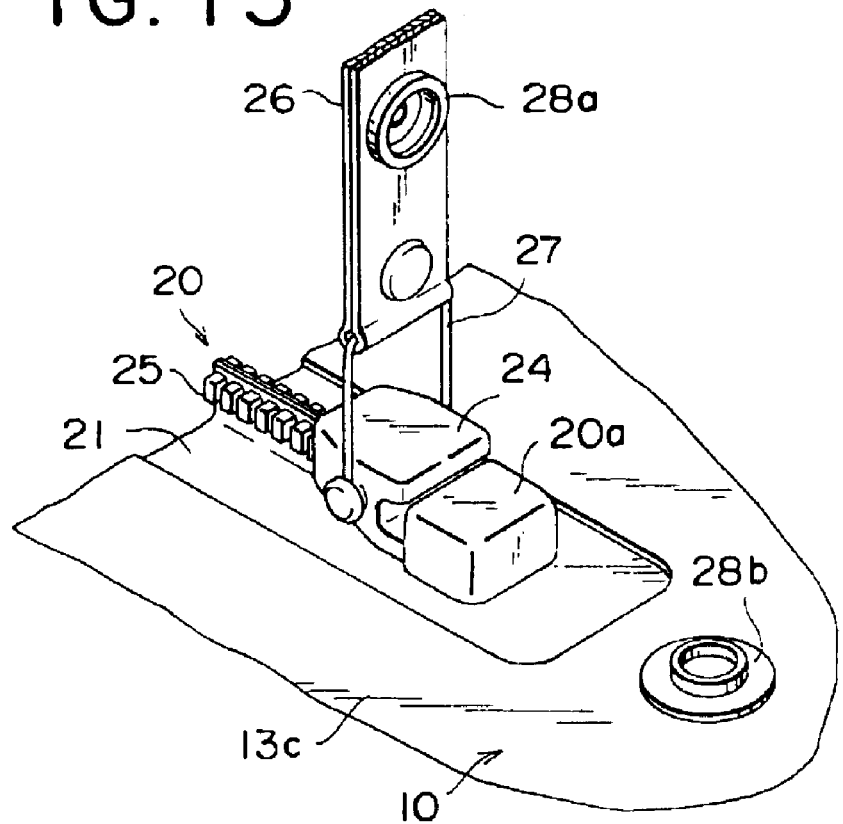
FIG. 15 is a partial perspective view showing an example of means for engagingly fitting the air tight water resistant slide fastener with the container.

FIG. 15 shows an example in which engaging and disengaging means for removably engaging the slider 24 and the right side face portion 13c of the container main body 10 with each other is provided in order to reliably prevent the aforementioned liquid leakage. In an example of the engaging and disengaging means shown in the figure, a female member 28a of a snap fastener is fixed to the above-mentioned pull tab 26 of the slider 24, and a male member 28b of the snap fastener is fixed to the right side face portion 13c.

Figure 16:
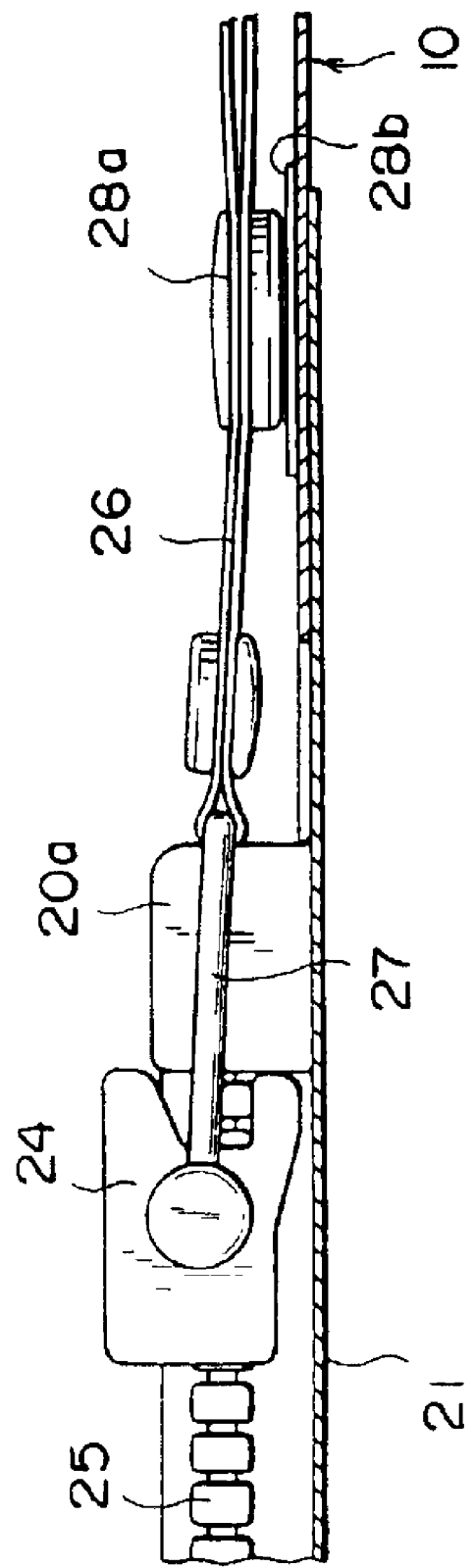
FIG. 16 is a partial side view showing an example of an engagingly fitting state by the engagingly fitting means, partially cut out.

When the air tight, water resistant slide fastener 20 is closed, the connecting ring 27 of the slider 24 is turned to be engagingly fitted onto the upper stopper 20a. Further, as shown in FIG. 16, the male member 28b is engaged with the female member 28a, whereby the connecting ring 27 is prevented from slipping off from the upper stopper 20a, as far as they are intentionally disengaged from each other. As a result, no liquid leakage occurs. Furthermore, even if the connecting ring 27 of the slider 24 is not adapted to be engaged to the upper stopper 20a, only engaging and disengaging means using the aforementioned snap fastener may be, of course, employed to ensure engagement.

Figure 17:
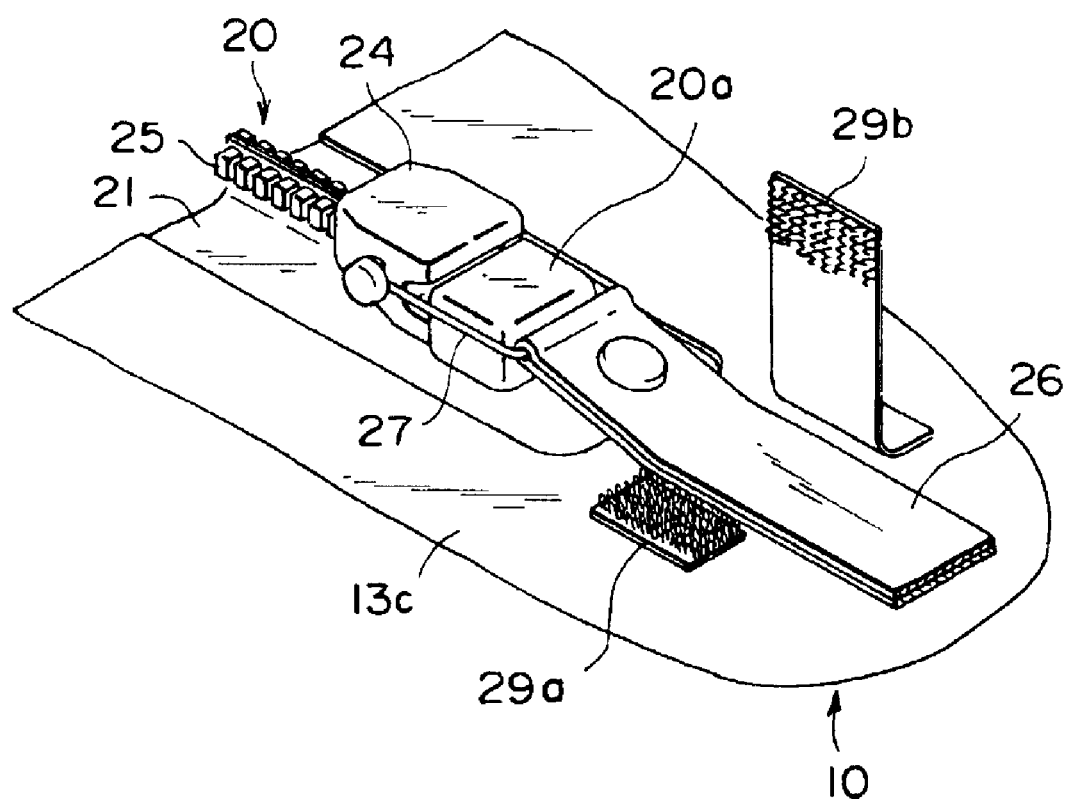
FIG. 17 is a partial perspective view showing another example of the engagingly fitting means when the air tight water resistant slide fastener is engagingly fitted to the container.

FIG. 17 shows a modified example of the engaging and disengaging means. While the connecting ring 27 is engagingly fitted onto the upper stopper 20a, the female member 29a and male member 29b of the surface fastener are engaged with each other within a range of the right side face portion 13c of the container main body 10 and where the pull tab 26 of the slider 24 can reach. At this time, the surface fastener is fixed so as to be pressed to the surface of the right side face portion 13c encompassing the pull tab 26 by the surface fastener. Although it is not shown, the female member 29a or male member 29b of the surface fastener may be integrally mounted or molded to the pull tab so that the mating male member 29b or female member 29a can be fixed to the surface of the right side face portion 13c of the container main body 10, whereby the strength in engagement of the pull tab 26 with the right side face portion 13c increases.

Figure 18:
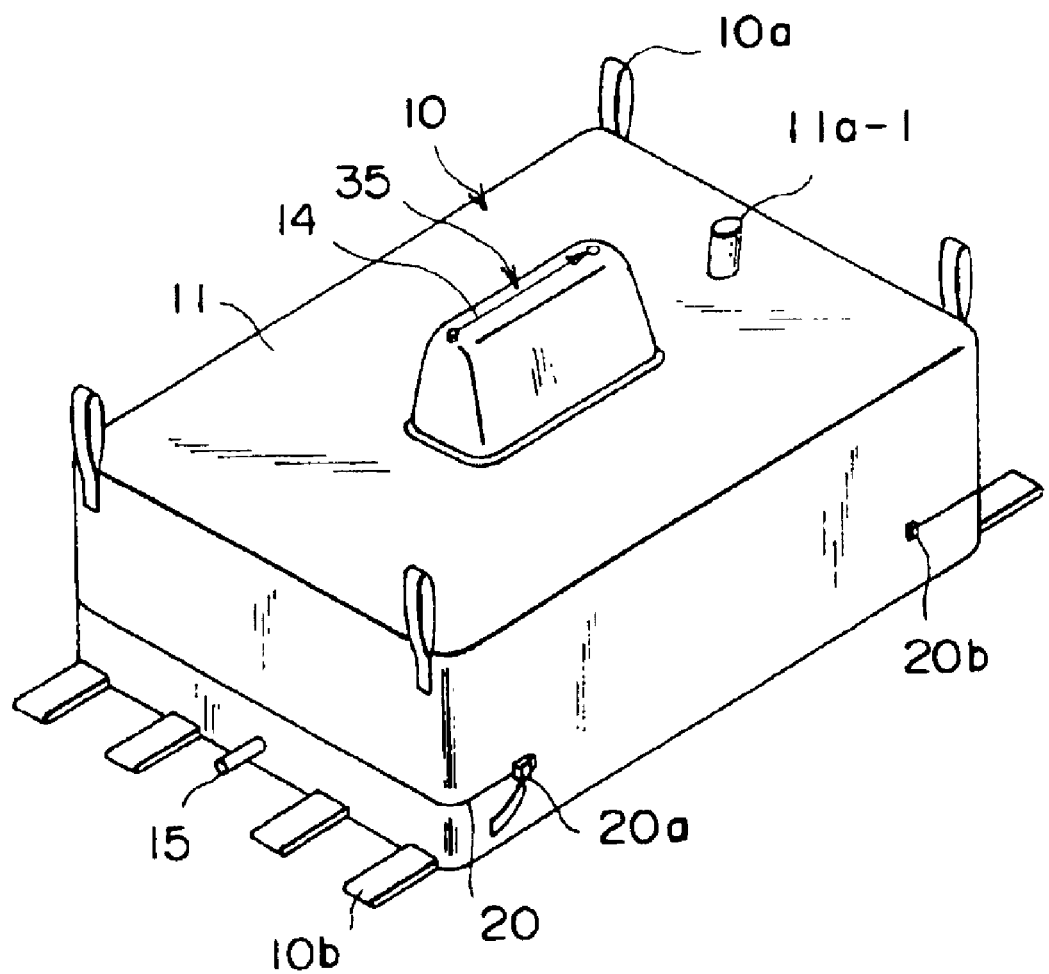
FIG. 18 is a perspective view schematically showing another embodiment of a flexible container for liquid transport according to the present invention.

In FIG. 18, a stirring port 14 protruded in a substantially rectangular shape is provided at a center of the top face portion 11 of the container main body 10. An air tight, water resistant slide fastener 35, which is similar in construction to the air tight, water resistant slide fastener 20, is fixed to an opening of the top portion, thereby making it possible to open or close the opening. By doing this, the air tight, water resistant slide fastener 35 is spaced from the top face portion 11 of the container main body 10, and moreover, the stirring port 14 can be determined to an arbitrary size without being influenced by various scale of the pressure applied during liquid transport.

Figure 19:
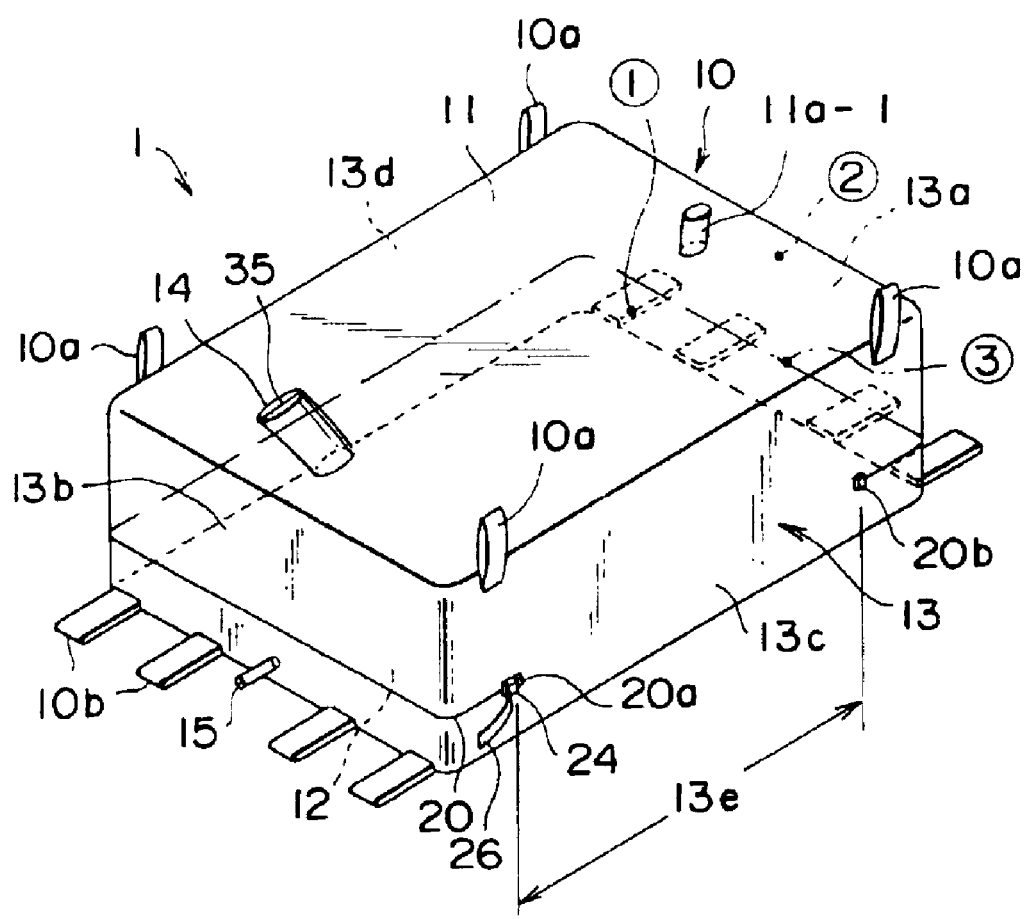
FIG. 19 is a perspective view schematically showing a second typical embodiment of the flexible container for liquid transport according to the present invention.

FIG. 19 is a perspective view schematically illustrating an appearance of another embodiment of the flexible container 1.

Like the above illustrative embodiment, a cylindrical liquid stirring port 14 is protruded at a position close to the rear face portion of the top face portion 11 of the flexible container main body 10 according to the present embodiment. To the opening, there is mounted an air tight, water resistant slide faster 35 having the same structure as the air tight, water resistant slide fastener 20 mounted to the peripheral face portion 13. In the case where the air tight, water resistant slide fastener 35 mounted to the opening of this liquid stirring port 14 is opened and closed by its necessary amount, thereby evacuating redundant air in the container to the outside, the slide fastener 35 constitutes a part of the air evacuating means according to the present invention.

Furthermore, even at the rear face portion 13b of the container main body 10, a liquid injecting and ejecting port 15 for liquid being transported is protruded at the lower end center thereof. A hose or the like (not shown) is connected to this liquid injecting and ejecting portion 15 from outside for injection and ejection. Further, this liquid injecting and ejecting port 15 plays an important role when another washing method of the present invention is implemented, as described later.

Like the aforementioned embodiment, tape looped container suspending pieces 10a are mounted respectively to the four upper corners of the flexible container main body 10. These container suspending pieces 10a are used to lift an upper portion of the container 10 and facilitate air entry into the container main body 10 via the above-mentioned liquid injecting and ejecting port 15, as described previously. During liquid transport, the flexible container 1 is suspended through a wave eliminating bar (not shown) extended above the container. The wave eliminating bar restrains a vertical movement of the top face portion 11 of the container main body 10 from above and restricts waving of the liquid due to vibration caused during transport.

Further, as shown in FIG. 6 and as described previously, four bottom face portion fixing pieces 10b each comprising a band shaped self-fastening type surface fastener are mounted at the lower end edges of the front face portion 13a and rear face portion 13b of the flexible container main body 10. Here, a self-fastening type surface fastener is referred to as a surface fastener comprising an engagement face in which a number of hook shaped engagement elements and loop shaped engagement elements coexist, and are provided on one side of a tape, for example. The self-engaging surface fastener has a function for engaging the coexisting hook shaped engagement elements with loop shaped engagement by compressing the engagement faces of the same tape and for disengaging the mutually engaged hook shaped engagement elements from loop shaped engagement when a force is applied to a direction in its fastening face.

Figure 26:
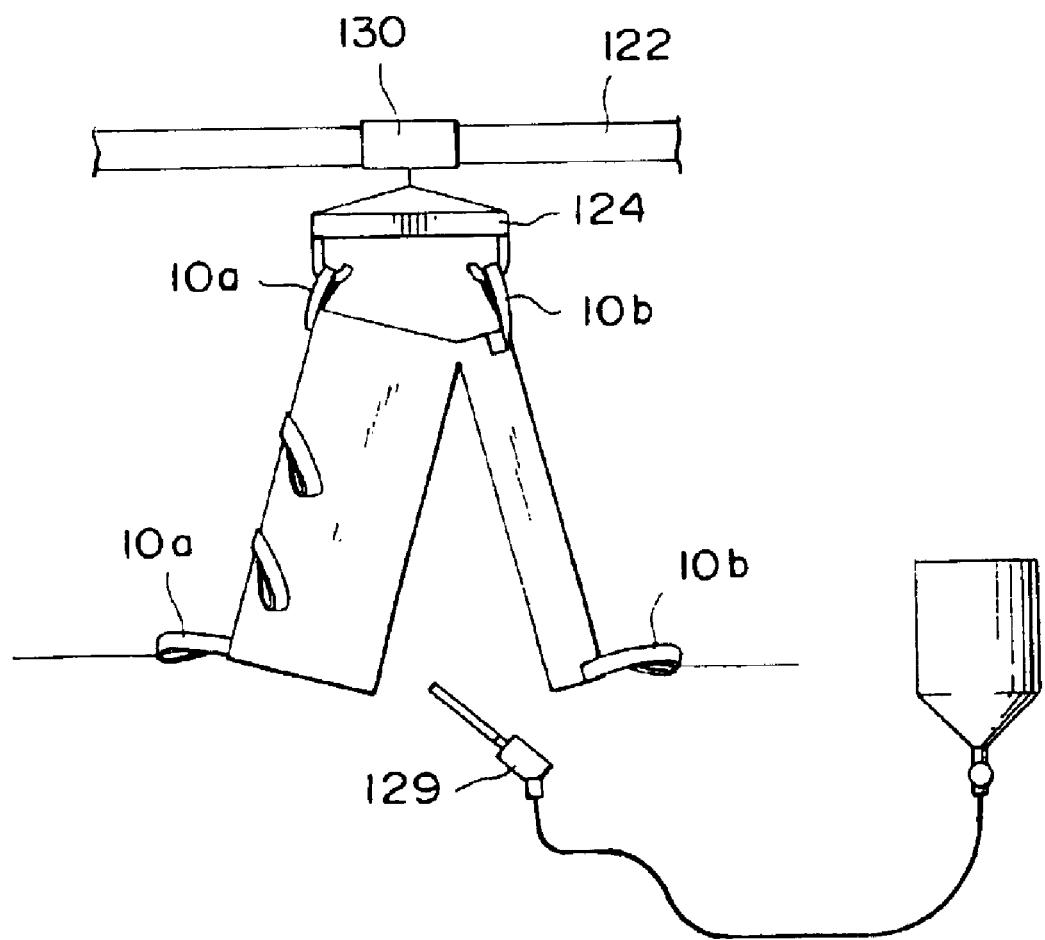
FIG. 26 is an explanatory view showing a first step of washing using the second washing equipment.
Figure 27:
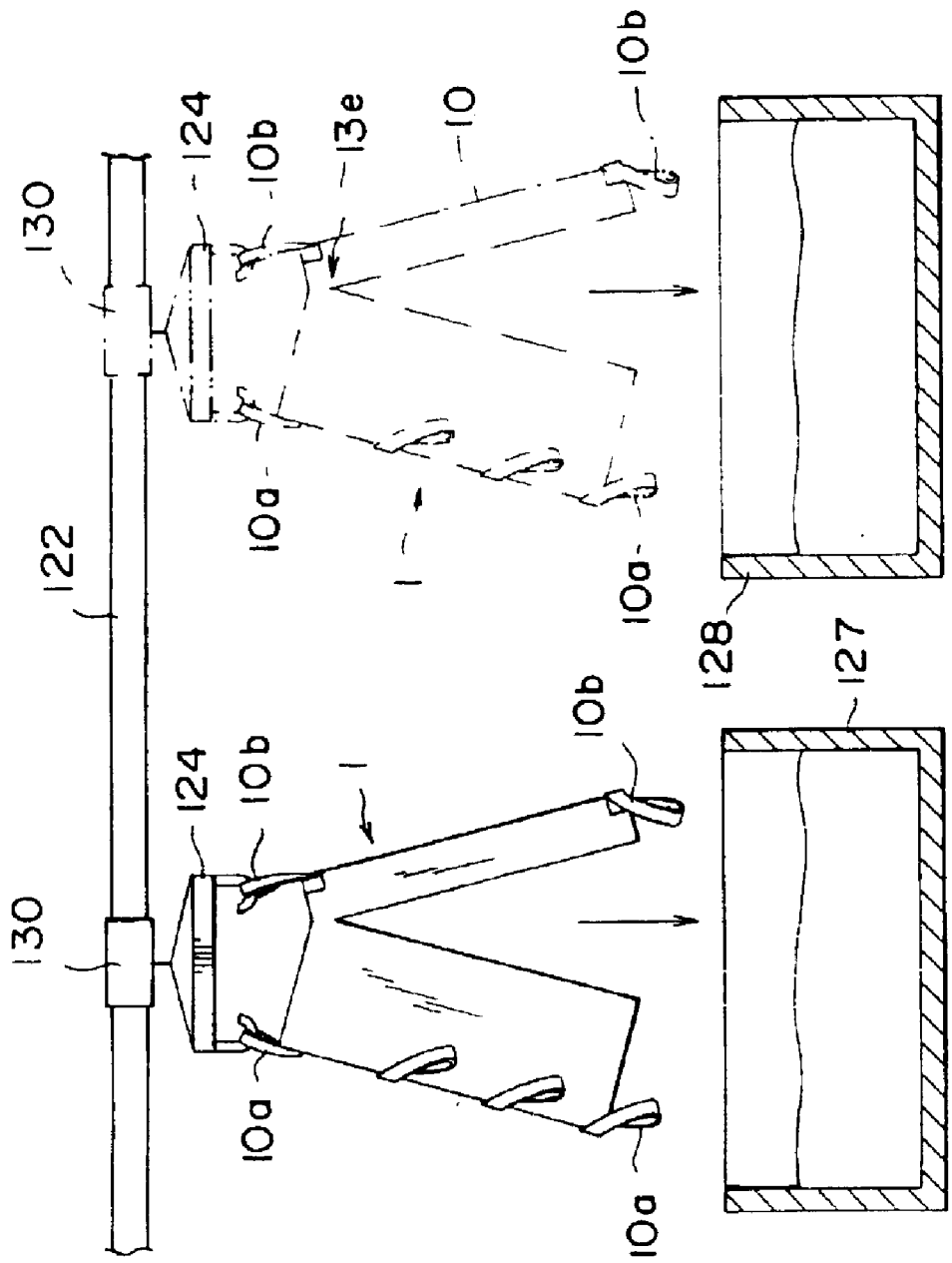
FIG. 27 is an explanatory view showing a pre-washing step and a finish washing step using the washing equipment.
Figure 28:
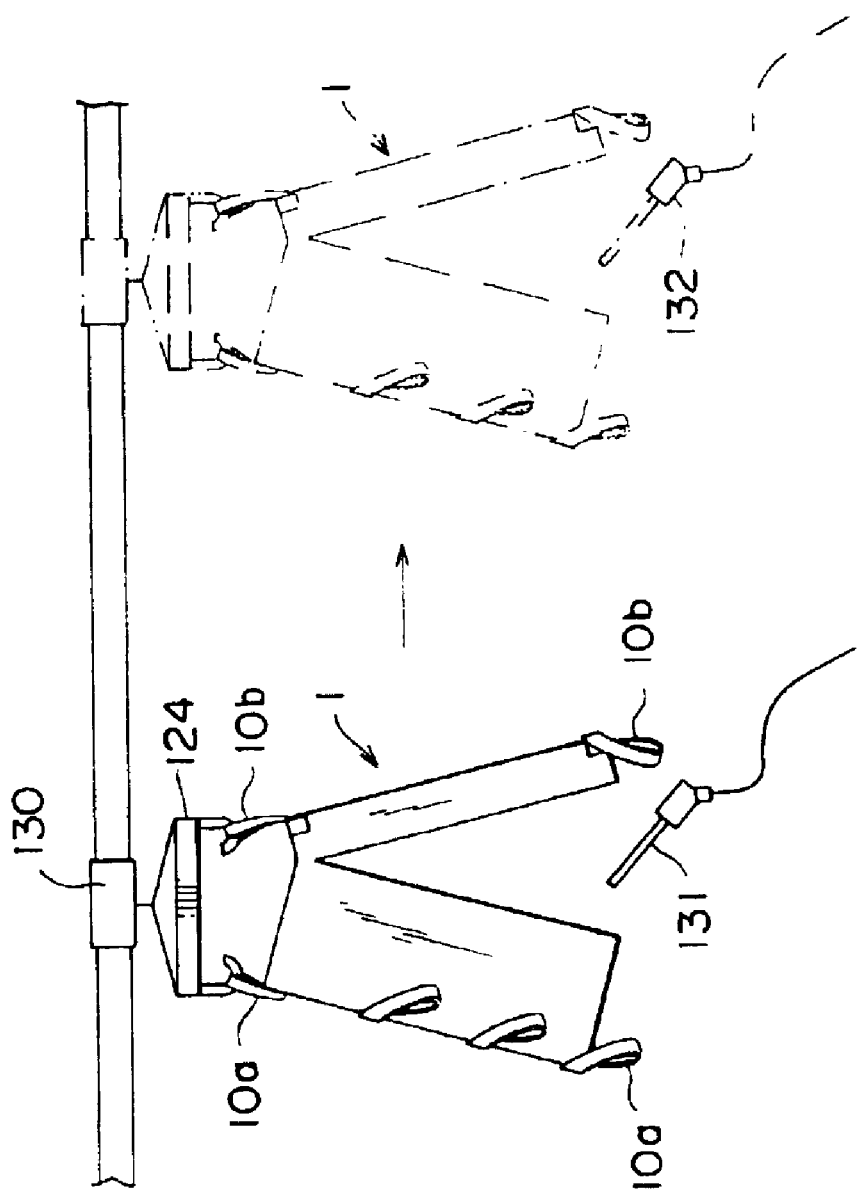
FIG. 28 is an explanatory view showing washing steps based on a modified example of the facility.
Figure 29:
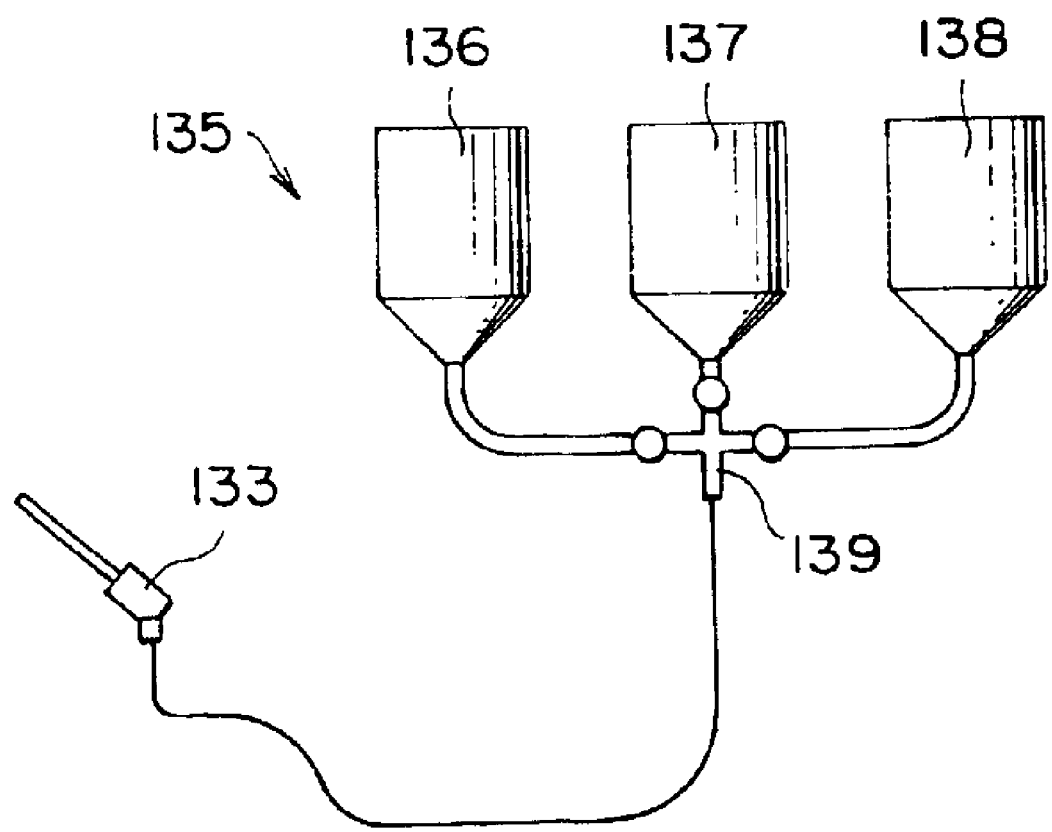
FIG. 29 is an explanatory view showing a schematic construction of an example of a jet washing apparatus that can be used for the facility.

In the embodiment, the container suspending pieces 10a and the bottom face portion fixing pieces 10b are employed for suspension on the hook of a hoist 130 as shown in FIG. 26 to FIG. 28 when the air tight, water resistant slide fastener 20 is opened, and the flexible container main body 10 is spread out, thereby subjecting the container 1 to washing, sterilizing, disinfecting, or drying treatment. Further, in the embodiment as well, the mount positions of the air tight, water resistant slide fastener 20, the upper stopper 20a and lower stopper 20b are particularly important. These stops are mounted at their positions similar to those in the above embodiment. The functions of these stops are described in detail in the above embodiment, and thus, the detailed description thereof is omitted here.

Figure 20:
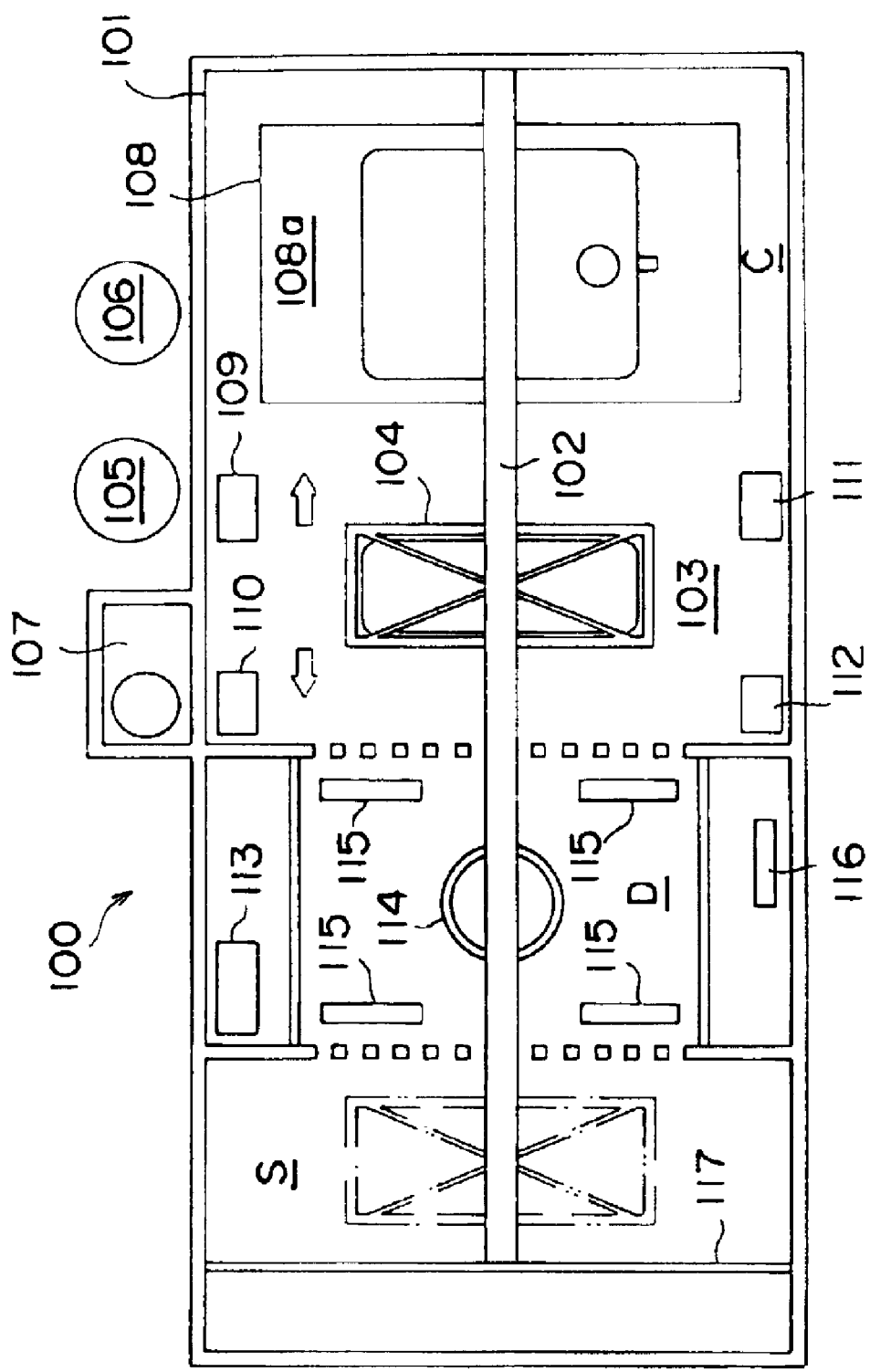
FIG. 20 is a plan view showing an outline of a first washing equipment according to the present invention.

FIG. 20 shows a layout example of various apparatuses or devices in a first washing equipment according to the present invention for the purpose of performing washing, sterilizing and disinfecting treatment, and drying of the flexible container 1 having the above structure. This washing equipment 100 is installed in a washing and storage specific building 101, and a hoist movement rail 102 is bridged in a longitudinal direction on a ceiling of the building 101. A hoist (not shown) is arranged at the hoist movement rail 102. Two or more hoists may be arranged. According to the illustrated example, a work site 103 is laid out at a center of the building 101, the flexible container 1 to be washed, which was carried in a folded state from the outside, is loaded on a suspending metal fitting 104 at the work site 103, is prepared for movement to the washing steps or for a variety of maintenance activities. A warm water tank 105 for washing liquid and a tank 106 containing sodium hypochlorite aqueous solution for sterilization and disinfection are placed outside of the building 101. Although it is not shown, a water tank may be further placed.

Figure 21:
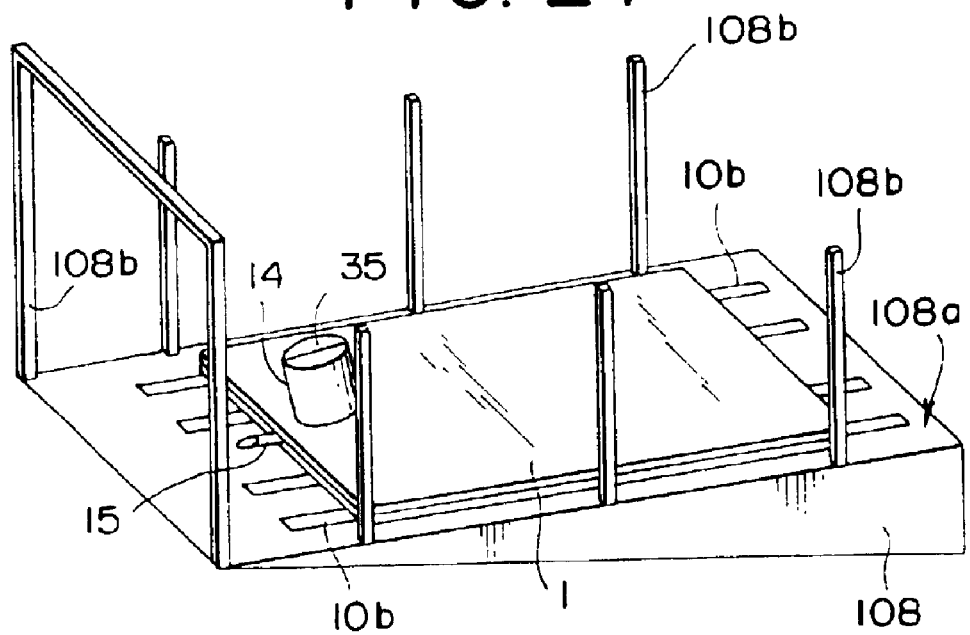
FIG. 21 is an explanatory view showing a first step of a washing method using the first washing equipment according to the present invention.

A boiler chamber 107 is placed outside of the work site 103. A washing area C is formed to be partitioned adjacent to one side of the work site 103, and a washing stage (a washing base) 108 is placed at a center of the washing area C. According to this embodiment, as shown in FIG. 21, the washing stage 108 has an area equal to an inclined face 108a on which the flexible container 1 is placed to be spread out in its contracted state. In other words, the stage has an area and shape which are substantially equal and identical to the bottom face portion 12 of the container 1. A plurality of columns 108b are provided at a peripheral edge of the inclined face 108a of the washing stage 108 for supporting the container 1 at the periphery thereof when the flexible container 1 spread out in its contracted state is formed to be in a wrinkle free, swelled state. The container placement face of the washing stage 108 may not be such an inclined face but may be a mere horizontal face.

According to this embodiment, in addition to the washing stage 108, there are arranged in the washing area C various devices such as a jetting nozzle 109 for jetting washing liquid, sterilizing and disinfecting solution; a jetting nozzle 110 for washing the outer surface of the flexible container 1; a hand-held blower 111 for blowing air into the flexible container 1; and similarly a blower 112 for blowing air into the flexible container 1 via an air hose 118.

On the other hand, a drying area D is formed to be partitioned on a opposite side of the work site 103. In this drying area D, there are arranged a heater 113, a fan 114, a sterilizing lamp 115, and an ozone generator 116. This drying area D has such a structure that communicates with the work site 103 adjacent to the drying area D, and a storage chamber S, which will be described later, respectively. A storage chamber S for storing the washed flexible container 1 is formed to be partitioned adjacent to the drying area D on a opposite side to the work site 103. A plurality of racks 117 are provided to be partitioned in several lines in the storage chamber S.

By the first washing equipment 100 having the above construction, the flexible container 1 having been carried from outside is washed as follows. First, the folded and carried flexible container 1 is transferred to the suspending metal fitting 104 suspended by a hoist (not shown). Then, the suspending metal fitting 104 is moved to above of the inclined face 108a of the washing stage 108 in the washing area C by driving the hoist, and the flexible container 1 is transferred to the inclined face 108a of the washing stage 108. The flexible container 1 transferred to the inclined face 108a is spread out so that the bottom face portion 12 is at the bottom. At this time, it is checked to ensure that the air tight, water resistant slide fasteners 20 and 35 are fully closed, and the liquid injecting and ejecting port 15 is oriented to the lower end of the inclined face 108a (see FIG. 21).

Figure 22:
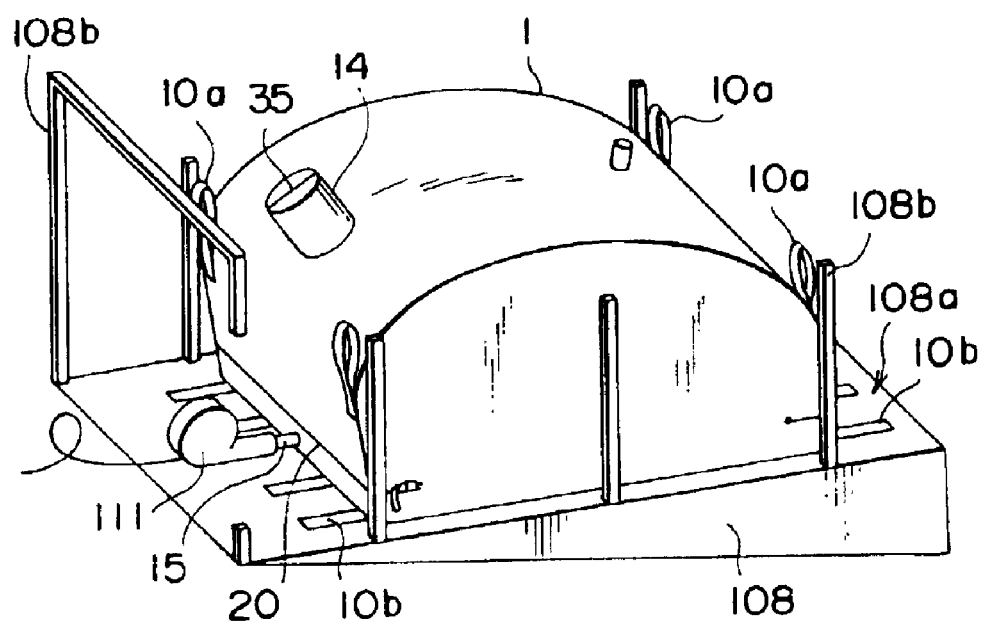
FIG. 22 is an explanatory view showing a second step thereof.

Then, as shown in FIG. 22, the air is blown from the liquid injecting and ejecting port 15 to the inside of the container 1 using the hand-held blower 111, and the container 1 is swelled. The hand-held blower 111 according to this embodiment is capable of blowing an air of 2.8 m³ per minute·560 mmAq. There is a danger that, if air is blown excessively during this air blowing, the container 1 is explored. Thus, in general, it is preferable to blow the air of such a quantity that is about 80% of the capacity of the flexible container 1 within 10 minutes.

Figure 23:
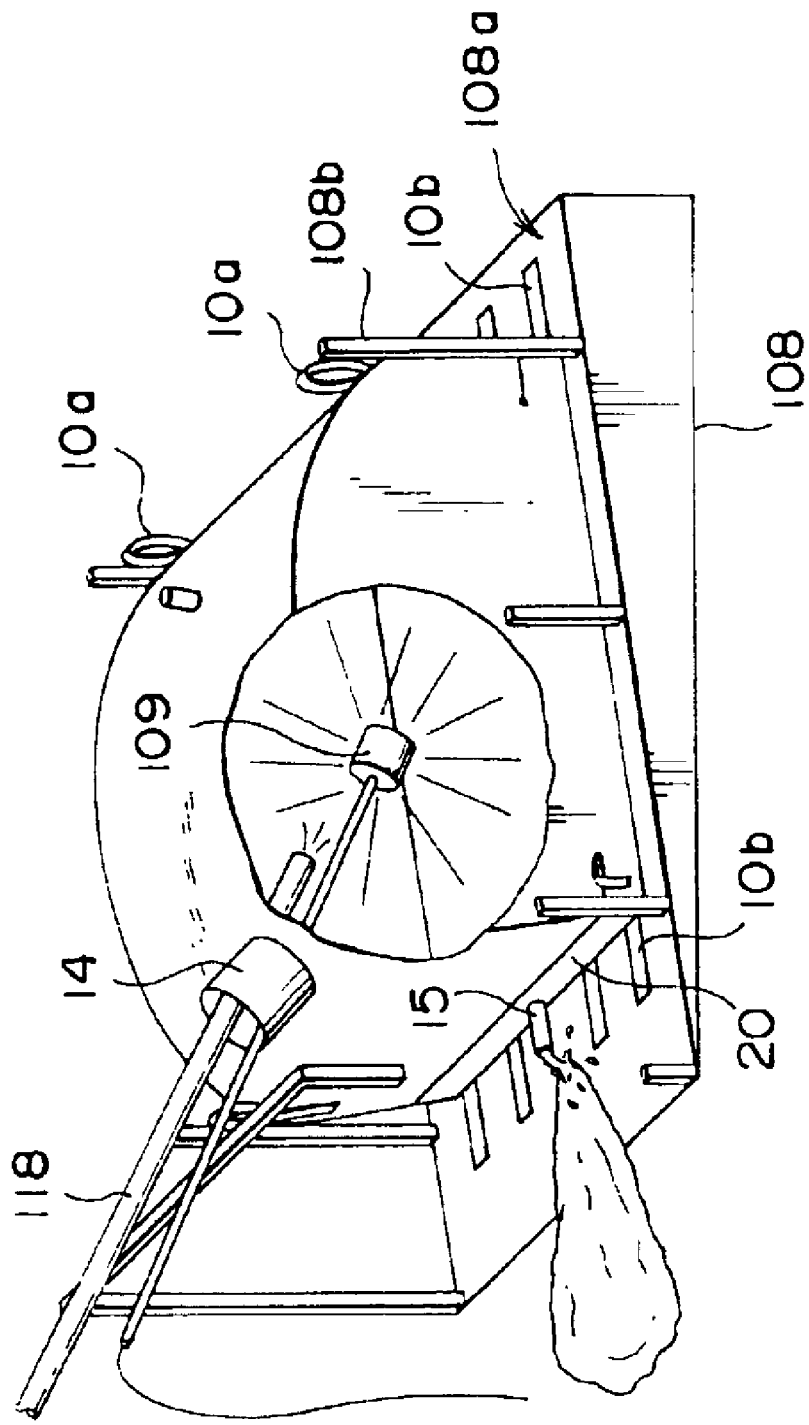
FIG. 23 is an explanatory view showing the final step of the washing method.

After the flexible container 1 is thus swelled to be formed in shape, the air blowing by the hand-held blower 111 is stopped. With the liquid stirring port 14 opened, the jetting nozzle 109 is inserted from the liquid stirring port 14 into the container as shown in FIG. 23, and the warm water as washing liquid is jetted toward an internal wall face of the container 1. At this time, while the liquid injecting and ejecting port 15 is kept open, air is blown simultaneously from the blower 112 via the air hose 118. By blowing such air, the flexible container 1 is prevented from being contracted, and the liquid ejection from the air injecting and ejecting port 15 is facilitated. In the present embodiment, a three-dimensional jetting nozzle is employed for the jetting nozzle 109. This three-dimensional jetting nozzle has a spherically shaped head portion or has a structure for jetting the liquid in radiant shape as being rotated by the liquid pressure. The washing liquid can be jetted uniformly toward the internal wall face of the flexible container 1.

Figure 24:
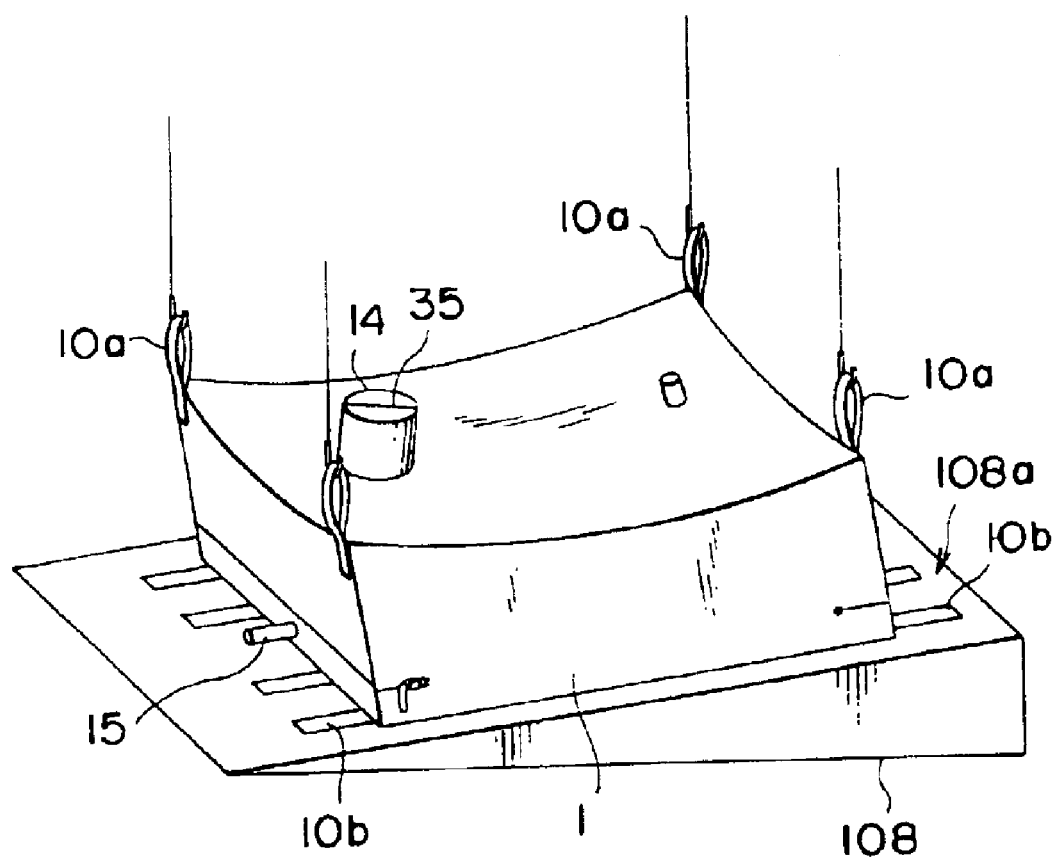
FIG. 24 is an explanatory view showing a modified example of the second step.

In the present embodiment, means for forming the container 1 in its normal shape is effected by blowing air. However, by taking advantage of the fact that the container 1 has container suspending pieces 10a and the bottom face portion fixing pieces 10b, the entire container may be formed in wrinkle free, normal shape by suspending the container suspending pieces 10a on the hoist as shown in FIG. 24, and pulling the bottom face portion fixing pieces 10b in all directions to be fixed so that the bottom face portion 12 is spread out. Or, both of these means and the above-described air blowing can be used together.

The liquid ejected from the liquid injecting and ejecting port 15 becomes transparent when pre-washing has been completed. After the completion of this pre-washing, sterilizing and disinfecting treatment is done as finish washing. The sterilizing and disinfecting treatment according to the present embodiment is performed in the same manner as the aforementioned pre-washing. As washing liquid (sterilizing and disinfecting solution) for this purpose, there can be used a chlorine based agent, for example, an aqueous solution of sodium hypochlorite whose concentration is 300 ppm or less, in place of warm water.

Further, in the present embodiment, after the sterilizing and disinfecting treatment has been done, the similar washing operation using warm water is performed, and the washing steps are ended. In the present embodiment, during the above washing, the warm water is jetted to the external surface of the container 1 by using the jetting nozzle 110, so that the outer face is washed simultaneously. At this time, the jetting nozzle 110 has a capacity of 150 kg/cm²·15 l per minute. When the material of the container 1 is considered, it is desirable that the jetting nozzle 110 is operated at least by 1 m distant from the container 1 during the warm water jetting. After the pre-washing and finish washing has been thus completed, the flexible container 1 is opened at the air tight, water resistant slide fastener 20 mounted to the peripheral face portion 13 of the container 1 in order to visually check whether or not residue remains at the inside of the container. If the residue or the like remains, it is wiped out using brush or the like together with washing liquid.

After all the washing steps have been completed, the flexible container 1 is transferred by means of a hoist (not shown) to the drying area D that is the next step. This drying area D is heated by means of a heater 113, and at the same time, a fan 114 installed on the ceiling rotates, so that the whole area is maintained at 80° C. After washing and sterilizing & disinfecting steps have been completed, the flexible container 1 is dried in this drying area D for 60 minutes. If 60 minutes are exceeded, the material of the container 1 is likely to be degraded, which is not preferable. Furthermore, the sterilizing lamp 115 and the ozone generator 116 are placed in this drying area D, thereby ensuring sterilization against the washed flexible container 1.

After the drying process has been completed in the drying area D, all of the liquid injecting and ejecting port 15, the air light, water resistant slide fasteners 20 and 35 of the respective liquid stirring port 14 and the peripheral face portion 13 of the flexible container 1 are closed. After the container has been folded, the container is transferred to the storage chamber S, and is maintained on the rack of the storage chamber S. At this time, the procedure for folding the flexible container 1 conforms to the folding procedure when pre-washing has been completed on a vehicle, which will be described later.

Figure 25:
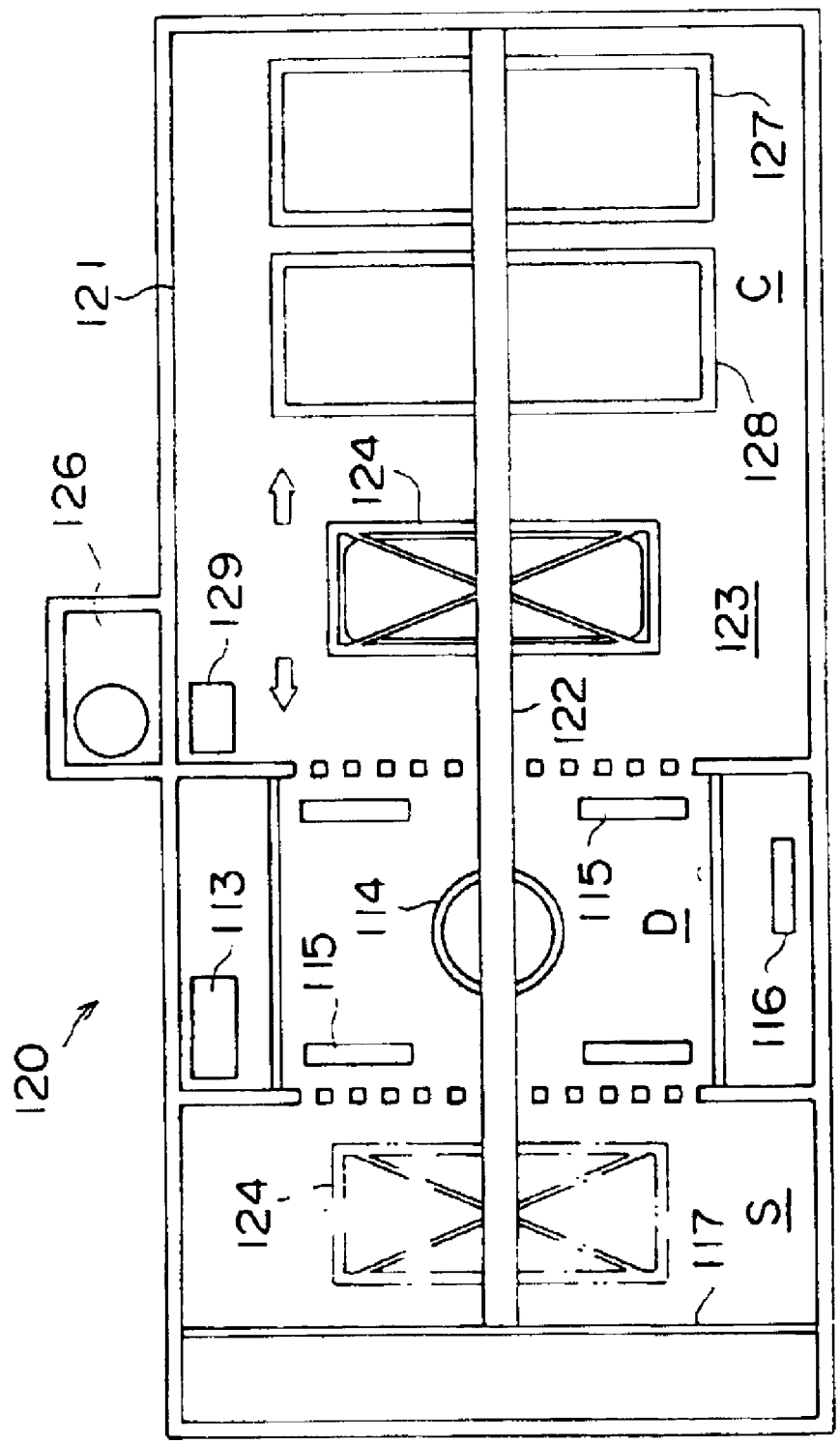
FIG. 25 is a plan view showing an outline of a second washing equipment according to the present invention.

FIG. 25 shows a second washing equipment 120 for a transport flexible container according to the present invention. According to the above first washing equipment 100, while the air tight, water resistant slide fasteners 20 and 35 are closed and the flexible container 1 is swelled, the washing liquid is jetted from the jetting nozzle 109, whereby the internal wall face of the container 1 is subjected to pre-washing and finish washing. In this washing equipment 120, while the above air tight, water resistant slide fasteners 20 and 35 are opened, the flexible container 1 is washed.

As shown in the figure, also in this second washing equipment 120, a hoist movement rail 122 is extended in a longitudinal direction on a ceiling in a washing, drying, storage specific building 121, like the first washing equipment 100. A hoist (not shown) is disposed at the hoist movement rail 122. Two or more hoists may be provided. According to the illustrated example, a work site 123 is placed at a center of a building 121, and the flexible container 1 to be washed, which was carried in its folded state from outside, is placed on a suspending metal fitting 124 at the work site 123, where it is prepared for movement to each washing step or for a variety of maintenance activities.

A boiler chamber 126 is placed at the outside of the work site 123. Further, the washing area C is formed to be partitioned adjacent to one side of the work site 123. In this washing area C, a washing liquid vessel 127 and a finish liquid vessel 128 are arranged in line in an extension direction of the hoist movement rail 122. According to the equipment of the present embodiment, an aqueous solution of 5 wt. % alkaline detergent of 60° C. is stored in the washing liquid vessel 127, and an aqueous solution containing a sodium hypochlorite whose concentration is 300 ppm or less is stored in the finish liquid vessel 128. Although it is not shown, a warm water vessel containing a warm water of about 60° C. may be placed adjacent to the finish liquid vessel 128. Further, in the work site 123, a jetting nozzle 129 for washing the outer surface of the flexible container 1 is arranged besides the aforementioned respective liquid vessels.

On the other hand, in this equipment of the present invention, a drying area D is formed to be partitioned on the other opposite side of the work site 123 like the above first washing equipment 100. A storage chamber S for storing the washed flexible container 1 is formed to be partitioned on a side of and adjacent to the drying area D opposite to the work site 123. In the storage chamber S, a plurality of container storage racks 117 are provided to be partitioned in several lines.

According to the thus constructed second washing equipment 120, the flexible container 1 to be washed is carried from outside in its folded state while the air light, water resistant slide fasteners 20 and 35 thereof are fully opened, and is suspended by hooking the container suspending pieces 10a and the bottom face portion fixing pieces 10b on a non-opening and closing portion 13e side on the suspending metal fitting 124. At this time, hooking portions of the suspending metal fitting 124 by the container suspending pieces 10a and bottom face portion fixing pieces 10b are positioned to be as close to each other as possible in order to ensure the hooking. Thus, when the container suspending pieces 10a and the bottom face portion fixing pieces 10b are hooked on the suspending metal fitting 124, the flexible container 1 is spread out in a reverse V shape as being fanned out about a basic point of the non-opening and closing portion 13e, so that the inside of the container is exposed to the outside.

When this container is spread out in such a reverse V shape, the container suspending pieces 10a and the bottom face portion fixing pieces 10b are pulled by wire or the like in a direction in which they are apart from each other. Then first, the inside and outside of the container 1 is washed by means of the jetting nozzle 129. At this time, as is the case with washing by the facility 100 according to the first embodiment, washing is performed in a state that the jetting nozzle 129 is distant at least by 1 m from the surface of the flexible container 1. Next, as indicated by solid lines shown in FIG. 27, a hoist 130 is driven and the flexible container 1 is moved immediately above the washing vessel 127.

FIG. 27 shows the washing procedure using the second washing equipment 120. The flexible container 1 moved immediately above the washing vessel 127 as described above is lowered together with the suspending metal fitting 124 by unwinding a chain (not shown) of the hoist 130. Then, the container 1 is immersed in warm water of the washing liquid vessel 127 containing an alkaline detergent in a state that the container 1 is being spread out. In the present embodiment, the immersion time is set to about 30 minutes. If this time has exceeded, the chain (not shown) of the hoist 130 is wound up, so that the washed flexible container 1 is pulled up from the washing liquid vessel 127 together with the suspending metal fitting 124.

The thus pre-washed and pulled up flexible container 1 is moved immediately above the finish liquid vessel 128 indicated by virtual lines shown in FIG. 27 by driving the hoist 130 again. Here, as in the washing operation, the container 1 is immersed for about 10 minutes in an aqueous solution containing a sodium hypochlorite of the finish liquid vessel 128. Then sterilization and disinfecting are performed, the container 1 is pulled up from the aqueous solution, so that the finish washing is completed. Although it is not shown, in the present embodiment, after the finish washing has been completed, the hoist 130 is driven and the washed flexible container 1 is immersed in the warm water contained in the warm water vessel (not shown) so that all of the washing steps are completed.

In this manner, washing, sterilizing and disinfecting can be performed concurrently with the container 1 being spread out. Further, as in the first washing equipment, when the container 1 is transferred to the next drying step, the container 1 can be easily moved by moving the hoist 130. Moreover, draining of the liquid in the container main body 10 is achieved in the middle of such movement, so that the drying efficiency is improved.

In such a washing or sterilizing and disinfecting treatment, without use of a treatment liquid vessel, the washing liquid, sterilizing and disinfecting solution can be jetted sequentially to the inside of the spread out container main body 10 by means of the jetting nozzles 131 and 132 as shown in FIG. 28. In the washing method shown in FIG. 27, although the jetting nozzles 131 and 132 respectively specific to the washing liquid, sterilizing and disinfecting solution are used, only one jetting nozzle can be employed for all of the washing steps.

FIG. 28 shows a washing liquid jetting apparatus 135 capable of performing three washing steps of pre-washing, finish washing, and warm water washing with only one jetting nozzle 133 while the flexible container 1 is being spread out. The washing liquid jetting apparatus 135 according to the present embodiment comprises: a washing tank 136 storing 60° C. warm water containing alkaline detergent as described above; a finish tank 137 storing an aqueous solution containing sodium hypochlorite as described above; and a warm water tank 138 storing 60° C. warm water. The tanks 136 to 138 are respectively connected to three input ports of a 5-port switching valve 139, and the jetting nozzle 133 is connected to an output port. The remaining one port serves as a neutral port. The number of ports should not be limited to the above embodiment but may be increased. Alternatively, a three-dimensional jetting nozzle is used for the jetting nozzle 133, thereby making it possible to install this washing liquid jetting apparatus 135 on the aforementioned first washing equipment 100.

Description of the washing equipment and method applicable to the flexible container 1 for liquid transport according to the present invention has now been completed. The liquid to be transported by the flexible container 1 of such type is often perishable drinks. Therefore, if the liquid in the container is replaced in another container at a transport destination, and is returned back to the transport source, the residual liquid in the container or the residue adhering to the internal wall of the container often causes bacteria or mold to occur or the residual liquid is perished. In the present invention, an empty flexible container 1 is subjected to temporary immediately after the liquid in the container has been replaced in another container at the transport destination, depending on the type of the transport liquid.

Figure 30:
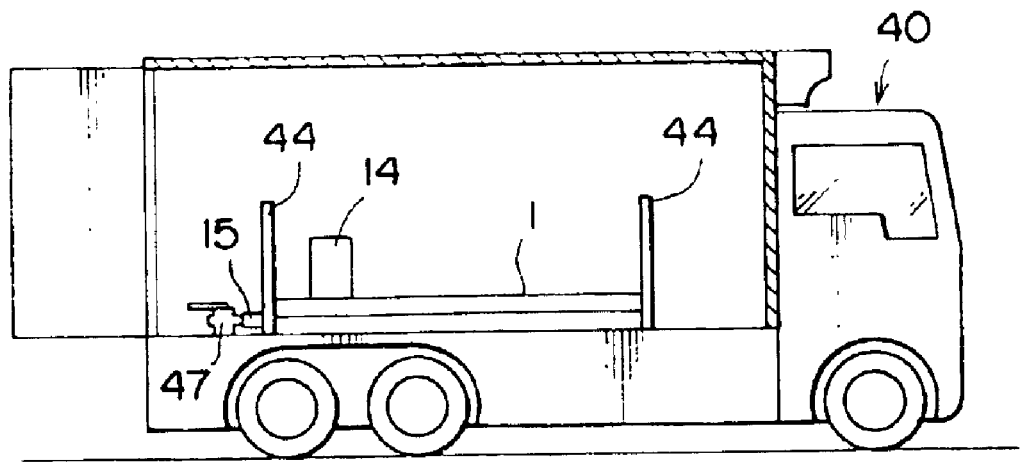
FIG. 30 is a schematic explanatory view showing a first stage of the pre-washing steps to be performed on a vehicle according to the present invention.
Figure 31:
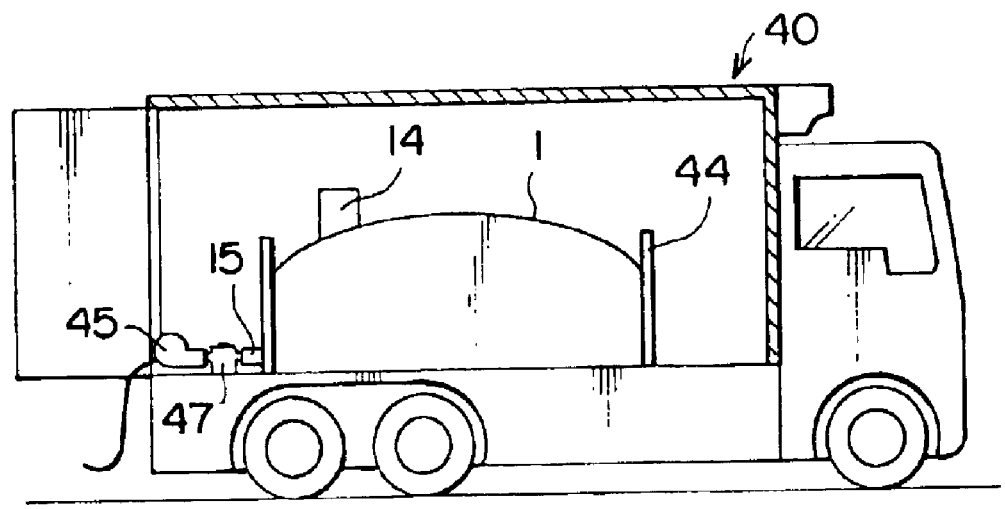
FIG. 31 is an explanatory view showing a second stage thereof.
Figure 32:
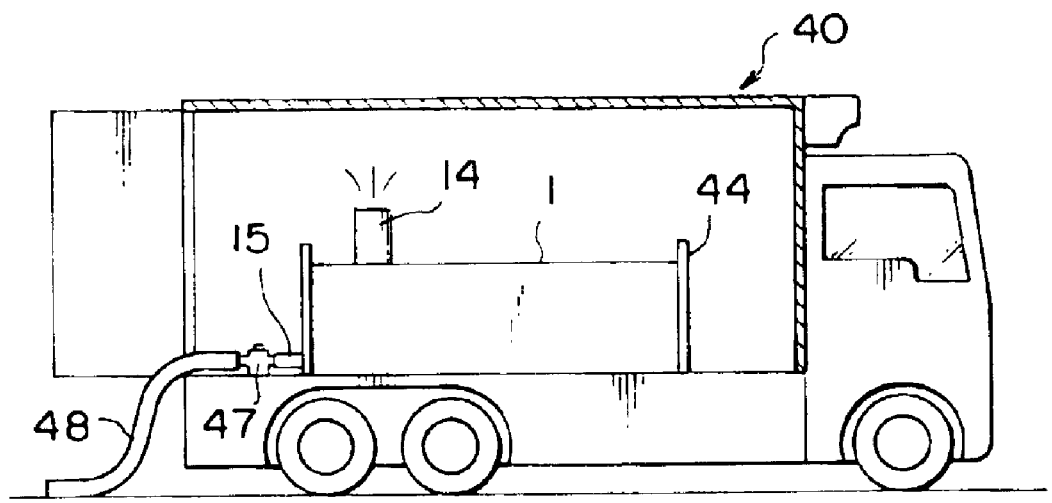
FIG. 32 is an explanatory view showing a third stage thereof.

FIG. 30 to FIG. 32 show that the temporary washing can be performed on a transport vehicle. On a floor face of a transport vehicle 40, there is provided a hand-held blower 45 for initially blowing air in the flexible container 1 to be swelled; and an opening and closing valve 47 or the like to be used when a hose is connected to a liquid injecting and ejecting port 15 when liquid is charged in the container 1 as described previously. Further, there are a support wall portion 44 consisting of a steel material panel for restricting and supporting movement of forward and backward face portions 13a and 13b of the container 1 after the liquid charge, and a wave eliminating bar (not shown) for restricting vertical movement of the top face portion 13 of the flexible container 1 during liquid transport, bridging above the container 1. In the present embodiment, the temporary washing is performed by utilizing the aforementioned members equipped on the vehicle 40.

Figure 33:
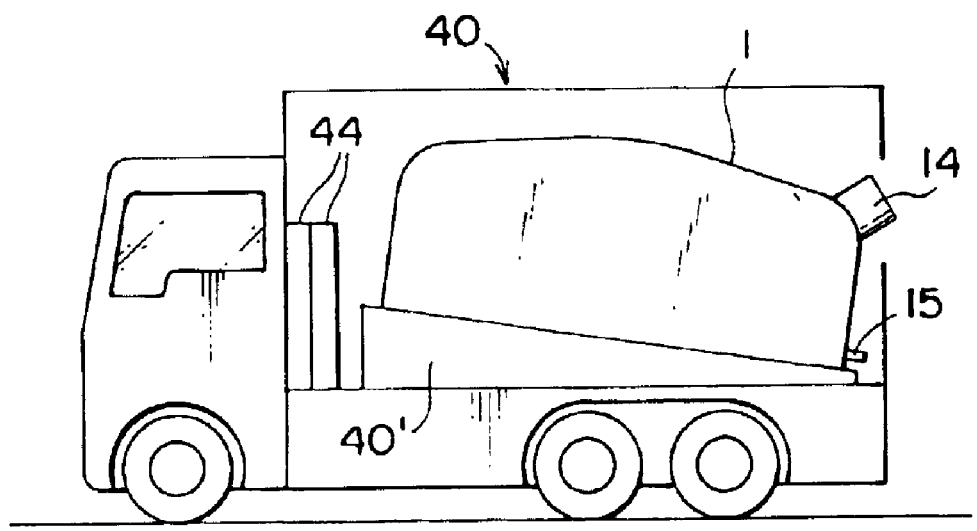
FIG. 33 is a side view showing a modified example of a pre-washing equipment on a vehicle.

In order to perform the temporary washing of the flexible container 1 on the vehicle, firstly the support wall portion 44 and the wave eliminating bar are set at their predetermined positions, a bottom face portion 12 is placed downside on the floor face between these members, and the flexible container 1 immediately after liquid ejection is placed as being spread out (see FIG. 30). At this time, the opening and closing valve 47 is mounted to the liquid injecting and ejecting port 15 of the container 1, and all of the other openings are kept closed. In the illustrated example, although the floor face of the vehicle 40 is used as a horizontal face, a wedge shaped washing base 40' for example may be placed on the floor face of the vehicle 40 as shown in FIG. 33, on which the spread out flexible container 1 is placed in the same manner as in the first washing equipment so that the temporary washing may be performed. The washing base 40' can be equipped on the vehicle if it has such a structure that can be assembled and dissembled.

Next, the hand-held blower 45 is mounted on the opening and closing valve 47, the valve 47 is opened to blow air into the container 1 so that the container 1 is formed to be in a wrinkle free, swelled state (see FIG. 31). Then, the opening and closing valve 47 is closed, the hand-held blower 45 is removed from the valve 47, to which the liquid injecting and ejecting hose 48 is connected. Then, the opening and closing valve 47 is opened, and warm water of about 60° C. is injected from the liquid injecting and ejecting port 15 (see FIG. 32). During this liquid injection, the air tight, water resistant slide fastener 35 mounted to the liquid stirring port 14 is opened to a required extent, and the air in the container 1 is ejected according to an increase in injected quantity of washing liquid. After the injection quantity of warm water has reached a predetermined charge quantity, the warm water is ejected from the liquid injecting and ejecting port 15 to the outside together with the residual liquid of transport liquid.

After it is verified that the warm water has been ejected, the flexible container 1 is folded. FIGS. 34 shows an example of the procedure for folding the flexible container 1 on a vehicle.

Figure 34A:
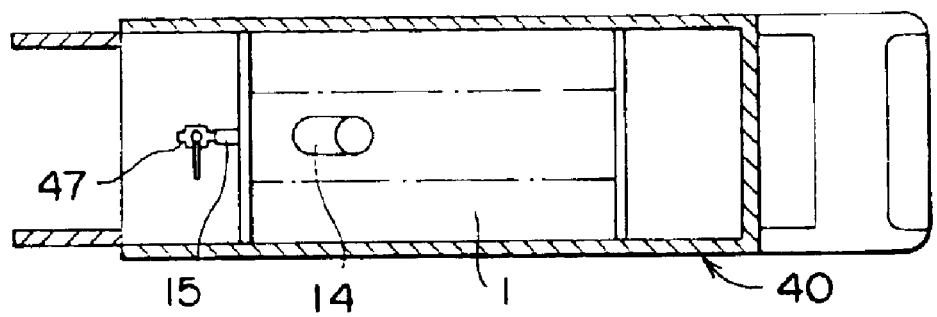
FIG. 34 is an explanatory view showing the steps of folding a flexible container on a vehicle.
Figure 34B:
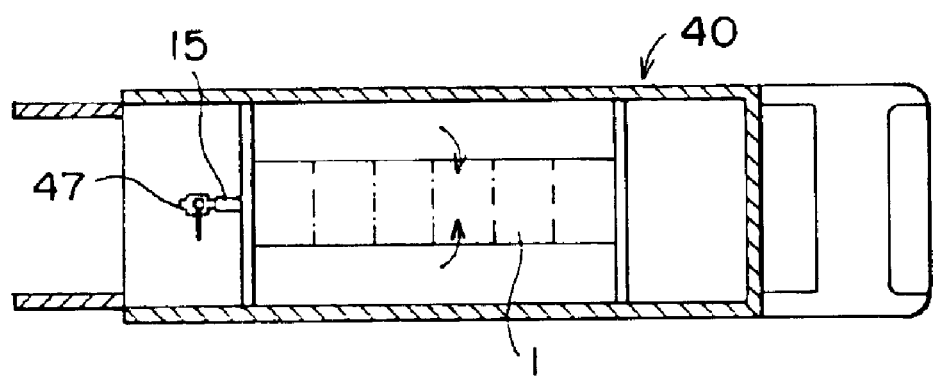
Figure 34C:
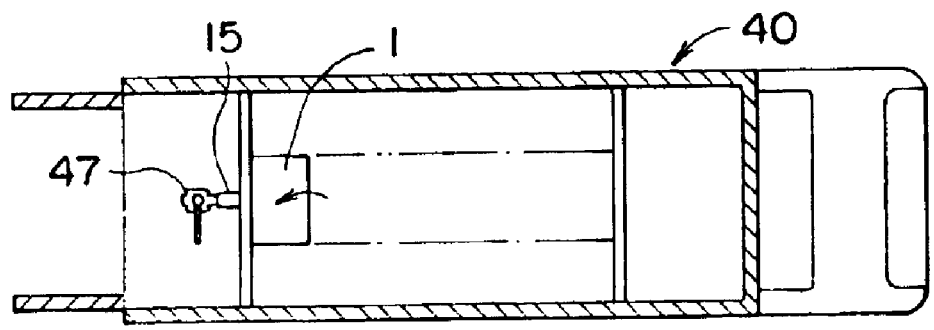
Figure 35:
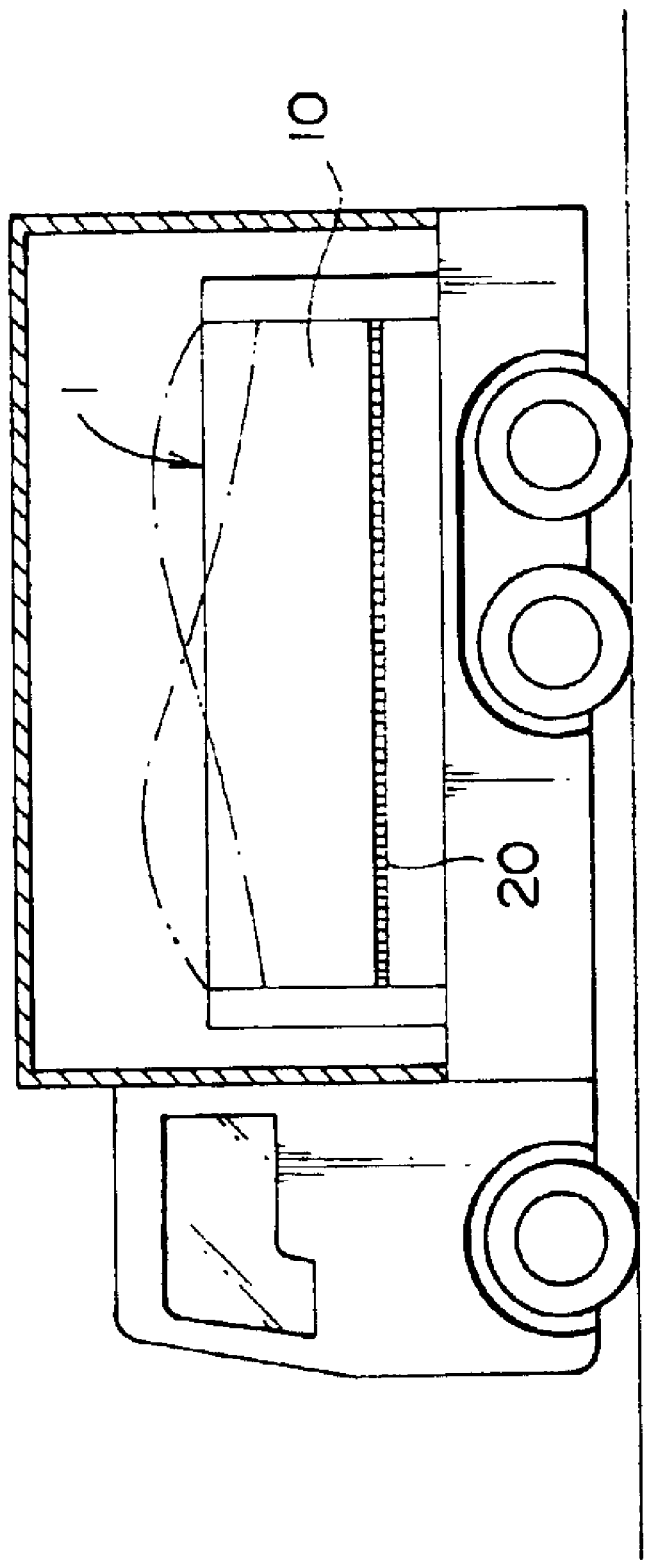
FIG. 35 is an explanatory view for illustrating a deformed state of the container based on liquid movement while the liquid is being transported using the flexible container.

First, as shown in FIG. 34A, the flexible container 1 spread out after the inside washing liquid has been ejected is folded upwardly from its opposite sides respectively by ⅓ of its width as indicated by the arrow shown in FIG. 34B. Then, the container 1 is folded back so as to be convoluted from the front end side to the rear end side of the container 1. At this time, the residual liquid inside of the container 1 outflows from the liquid injecting and ejecting port 15 protruding from the rear end as if the liquid were squeezed. The thus folded flexible container 1 is lifted from the carriage of the vehicle 40, and is stored in a predetermined container storage section (not shown). The procedure for folding the flexible container 1 is applicable to the folding procedure when the container is stored in the storage rack after washing as described previously.

As is evident from the foregoing description, the flexible container 1 for liquid transport according to the present invention is formed with a non-opening and closing portion at a part of the peripheral face thereof and is mounted with the air tight, water resistant slide fastener 20 on the peripheral face so that the container can be separated into the top face portion side and the bottom face portion side. Thus, the slide fastener 20 can be opened as required, whereby the inside of the container can be exposed to the outside. As a result, for example, when the flexible container 1 has been washed, the state of the inside of the container can be visually checked, thus making it possible to ensure reliable washing.

Further, the air tight, water resistant slide fastener 20 is mounted as described previously, whereby the inside and outside of the container 1 can be washed simultaneously when the slide fastener 20 is opened and the container 1 is spread out, thus making it possible to achieve efficient washing. Further, in the flexible container 1, the container suspending pieces 10a and the bottom face portion fixing pieces 10b are mounted at least at four corners thereof. Thus, not only the container 1 can be fixed on the floor face of the vehicle, but also these pieces can be efficiently utilized during the washing as described above.

Moreover, in the washing method according to the present invention, the liquid stirring port 14, liquid injecting ejecting port 15 which are formed at the flexible container 1 or various devices and members equipped on the transport vehicle for charging liquid in the flexible container are utilized for stirring operation or liquid injection or ejection during transport liquid charge, or are utilized in transport. Further, as described above, the respective structures or devices and the like can be efficiently utilized for a variety of washing activities, which ensures that the usability of the present invention is very high in the art.

It can be understood from the foregoing description that the present invention should not be limited to the above embodiments, and various modifications can be made within the scope and spirit of the present invention.

What is claimed:

1. An equipment for washing a flexible container for liquid transport made of an air tight, water resistant sheet material, the flexible container including a top face portion, a bottom face portion, and a peripheral face portion connecting the top face portion and bottom face portion, and comprising a liquid stirring port formed on the top face portion, a liquid injecting and ejecting port formed on the peripheral face portion in the vicinity of the bottom face portion and an air tight, water resistant slide fastener mounted to the peripheral face portion with an exception of a non-opening and closing portion, said washing equipment including:
a washing area and a drying area as partition for the flexible container;
guide passages provided between the washing area and the drying area for guiding and suspending the flexible container; and
suspending and movement means for the flexible container for guiding and moving it to the guide passages.

2. A washing equipment according to claim 1, wherein the guide passages are further extended to a storage area for the flexible container.

3. A washing equipment according to claim 1, wherein the washing area has container forming means for forming the empty flexible container to be in its swelled state.

4. A washing equipment according to claim 3, wherein the container forming means is a blower for blowing air into the container.

5. A washing equipment according to claim 1, wherein the washing area includes a washing base having an inclined face on its top face for placing the flexible container in such a position that the liquid injecting and ejecting port is at a lower side of the inclined face.

6. A washing equipment according to claim 1, wherein the washing area includes a jetting nozzle to be inserted into a liquid stirring port of the flexible container for radiantly jetting washing liquid toward an internal wall of the container.

7. A washing equipment according to claim 1, wherein the washing area includes a washing liquid vessel and a sterilizing and disinfecting solution vessel where the flexible container is to be immersed therein.

8. A washing equipment according to claim 1, wherein the washing area further includes a jetting nozzle for jetting warm water of 40 to 70° C.

9. A washing equipment according to claim 1, wherein the washing area includes tanks for storing the washing liquid, sterilizing and disinfecting solution, and warm water; and jetting nozzles connected to the tanks via at least a 5-port switching valve.

10. A washing equipment according to claim 1, wherein the drying area includes a heater and a warm air blowing fan.

11. A washing equipment according to claim 10, wherein the drying area further includes a sterilizing and disinfecting lamp.

12. A washing equipment according to claim 10, wherein the drying area further includes an ozone generator.

* * * * *